(12) United States Patent
Orphanos et al.

(10) Patent No.: US 12,539,163 B2
(45) Date of Patent: Feb. 3, 2026

(54) UNITARY ENDOSCOPIC VESSEL HARVESTING DEVICES WITH A VISUAL CUE TO IDENTIFY ORIENTATION OF CUTTING ELEMENTS

(71) Applicant: Saphena Medical, Inc., West Bridgewater, MA (US)

(72) Inventors: Mark Orphanos, Foxboro, MA (US); Matt Petrides, West Bridgewater, MA (US)

(73) Assignee: Biomet Microfixation, LLC, Jacksonville, FL (US)

( * ) Notice: Subject to any disclaimer, the term of this patent is extended or adjusted under 35 U.S.C. 154(b) by 296 days.

(21) Appl. No.: 16/862,966

(22) Filed: Apr. 30, 2020

(65) Prior Publication Data

US 2020/0345408 A1 Nov. 5, 2020

Related U.S. Application Data

(60) Provisional application No. 62/841,413, filed on May 1, 2019.

(51) Int. Cl.
*A61B 18/14* (2006.01)
*A61B 17/00* (2006.01)
*A61B 18/00* (2006.01)

(52) U.S. Cl.
CPC .... *A61B 18/14* (2013.01); *A61B 2017/00296* (2013.01); *A61B 2018/00982* (2013.01);
(Continued)

(58) Field of Classification Search
CPC ... A61B 18/14; A61B 18/148; A61B 17/3201; A61B 17/320016; A61B 17/32002;
(Continued)

(56) References Cited

U.S. PATENT DOCUMENTS

| 4,357,940 A | 11/1982 | Muller |
| 5,185,006 A | 2/1993 | Williamitis et al. |

(Continued)

FOREIGN PATENT DOCUMENTS

| AU | 2007203086 A1 | 1/2009 |
| CN | 105188575 B | 3/2018 |

(Continued)

OTHER PUBLICATIONS

International Search Report and Written Opinion issued in International Application No. PCT/US2014/018737 mailed Jun. 18, 2014.
(Continued)

*Primary Examiner* — Joseph A Stoklosa
*Assistant Examiner* — Marina Delaney Templeton
(74) *Attorney, Agent, or Firm* — SCHWEGMAN LUNDBERG & WOESSNER, P.A.

(57) ABSTRACT

Unitary endoscopic vessel harvesting devices with an elastic force are disclosed. In some embodiments, such devices comprise an elongated body having a proximal end and a distal end, a tip disposed at the distal end of the elongated body. The tip having a visual cue indicating a location of at least one cutting element extending from the elongated body.

21 Claims, 25 Drawing Sheets

(52) U.S. Cl.
CPC ............... *A61B 2018/1415* (2013.01); *A61B 2018/1475* (2013.01)

(58) Field of Classification Search
CPC .......... A61B 17/00008; A61B 17/0218; A61B 17/320758; A61B 2017/00296; A61B 2017/00778; A61B 2017/3454; A61B 2017/2929; A61B 2018/1415; A61B 18/1475; A61B 18/00601; A61B 18/00982; A61B 18/00345; A61B 18/00386; A61B 18/00202; A61B 2090/3937; A61B 2090/3941; A61B 2090/3945; A61B 2090/3962; A61B 2090/3966; A61B 2090/3983; A61B 2090/3995; A61B 2090/0811; A61B 90/39

See application file for complete search history.

(56) References Cited

U.S. PATENT DOCUMENTS

| | | | |
|---|---|---|---|
| 5,209,749 A * | 5/1993 | Buelna | A61B 18/1492 606/45 |
| 5,350,391 A | 9/1994 | Benedetto | |
| 5,373,840 A | 12/1994 | Knighton | |
| 5,556,408 A | 9/1996 | Farhat | |
| 5,591,183 A | 1/1997 | Chin | |
| 5,601,581 A | 2/1997 | Fogarty et al. | |
| 5,676,636 A | 10/1997 | Chin | |
| 5,695,514 A | 12/1997 | Chin | |
| 5,702,813 A | 12/1997 | Baxter et al. | |
| 5,728,123 A | 3/1998 | Lemelson et al. | |
| 5,772,576 A | 6/1998 | Knighton et al. | |
| 5,797,946 A | 8/1998 | Chin | |
| 5,810,805 A | 9/1998 | Sutcu et al. | |
| 5,823,946 A | 10/1998 | Chin | |
| 5,873,889 A | 2/1999 | Chin | |
| 5,891,141 A | 4/1999 | Rydell | |
| 5,895,353 A | 4/1999 | Lunsford et al. | |
| 5,916,233 A | 6/1999 | Chin | |
| 5,921,919 A | 7/1999 | Chin et al. | |
| 5,941,819 A | 8/1999 | Chin | |
| 5,968,065 A | 10/1999 | Chin | |
| 5,976,168 A | 11/1999 | Chin | |
| 5,980,549 A | 11/1999 | Chin | |
| 5,984,937 A | 11/1999 | Morse et al. | |
| 5,993,378 A | 11/1999 | Lemelson | |
| 5,993,384 A | 11/1999 | Unsford et al. | |
| 6,019,771 A | 2/2000 | Bennett | |
| 6,030,406 A | 2/2000 | Davis et al. | |
| 6,036,714 A | 3/2000 | Chin | |
| 6,042,538 A | 3/2000 | Puskas | |
| 6,102,909 A | 8/2000 | Chen | |
| 6,162,173 A | 12/2000 | Chin | |
| 6,176,825 B1 | 1/2001 | Chin et al. | |
| 6,203,557 B1 | 3/2001 | Chin | |
| 6,203,559 B1 | 3/2001 | Davis et al. | |
| 6,264,670 B1 | 7/2001 | Chin | |
| 6,277,137 B1 | 8/2001 | Chin | |
| 6,287,304 B1 | 9/2001 | Eggers | |
| 6,348,037 B1 | 2/2002 | Chin | |
| 6,402,720 B1 | 6/2002 | Miller et al. | |
| 6,406,425 B1 | 6/2002 | Chin et al. | |
| 6,428,468 B1 | 8/2002 | Knighton et al. | |
| 6,428,539 B1 | 8/2002 | Baxter et al. | |
| 6,428,556 B1 | 8/2002 | Chin | |
| 6,432,044 B1 | 8/2002 | Lunsford et al. | |
| 6,471,638 B1 | 10/2002 | Chang et al. | |
| 6,506,200 B1 | 1/2003 | Chin | |
| 6,527,771 B1 | 3/2003 | Weadock et al. | |
| 6,569,082 B1 | 5/2003 | Chin | |
| 6,607,547 B1 | 8/2003 | Chin | |
| 6,673,087 B1 | 1/2004 | Chang et al. | |
| 6,702,813 B1 | 3/2004 | Baxter et al. | |
| 6,706,052 B1 | 3/2004 | Chin | |
| 6,749,609 B1 | 6/2004 | Lunsford et al. | |
| 6,752,756 B2 | 6/2004 | Lunsford et al. | |
| 6,811,546 B1 | 11/2004 | Callas et al. | |
| 6,814,696 B1 | 11/2004 | Chang et al. | |
| 6,830,546 B1 | 12/2004 | Chin et al. | |
| 6,951,568 B1 | 10/2005 | Chin | |
| 6,976,957 B1 | 12/2005 | Chin et al. | |
| 6,979,290 B2 | 12/2005 | Mourlas et al. | |
| 7,001,404 B1 | 2/2006 | Chin | |
| 7,033,357 B2 | 4/2006 | Baxter et al. | |
| 7,066,875 B2 | 6/2006 | Knighton et al. | |
| 7,214,180 B2 | 5/2007 | Chin | |
| 7,264,587 B2 | 9/2007 | Chin | |
| 7,276,075 B1 | 10/2007 | Callas et al. | |
| 7,326,178 B1 | 2/2008 | Lunsford et al. | |
| 7,344,536 B1 | 3/2008 | Lunsford et al. | |
| 7,384,423 B1 | 6/2008 | Chin | |
| 7,384,723 B2 | 6/2008 | Kakuta et al. | |
| 7,398,781 B1 | 7/2008 | Chin | |
| 7,476,198 B1 | 1/2009 | Chin et al. | |
| 7,485,092 B1 | 2/2009 | Stewart et al. | |
| 7,534,243 B1 | 5/2009 | Chin et al. | |
| 7,544,195 B2 | 6/2009 | Lunsford et al. | |
| 7,556,633 B2 | 7/2009 | Lindsay | |
| 7,645,289 B2 | 1/2010 | Bayer | |
| 7,695,470 B1 | 4/2010 | Stewart et al. | |
| 7,867,163 B2 | 1/2011 | Chin et al. | |
| 7,887,558 B2 | 2/2011 | Lin et al. | |
| 7,918,848 B2 | 4/2011 | Lau et al. | |
| 7,931,590 B2 | 4/2011 | Willis | |
| 7,938,842 B1 | 5/2011 | Chin | |
| 7,972,265 B1 | 7/2011 | Chin et al. | |
| 7,981,133 B2 | 7/2011 | Chin | |
| 8,075,559 B2 | 12/2011 | Stewart et al. | |
| 8,083,664 B2 | 12/2011 | Davis | |
| 8,097,010 B2 | 1/2012 | Kasahara et al. | |
| 8,197,472 B2 | 6/2012 | Au et al. | |
| 8,241,210 B2 | 8/2012 | Lunsford et al. | |
| 8,372,096 B2 | 2/2013 | Kadykowski et al. | |
| 8,414,480 B2 | 4/2013 | Kendale et al. | |
| 8,460,331 B2 | 6/2013 | Chin | |
| 8,623,003 B2 | 1/2014 | Lau et al. | |
| 8,657,818 B2 | 2/2014 | Lin | |
| 8,676,636 B2 | 3/2014 | Genschel et al. | |
| 9,119,900 B2 | 9/2015 | Chin | |
| 9,498,246 B2 | 11/2016 | Chin et al. | |
| 9,730,782 B2 | 8/2017 | Stewart | |
| 9,798,246 B2 | 10/2017 | Streefkerk et al. | |
| 9,814,481 B2 | 11/2017 | Orphanos et al. | |
| 9,943,328 B2 | 4/2018 | Orphanos et al. | |
| 10,363,056 B2 | 7/2019 | Orphanos et al. | |
| 10,537,353 B2 | 1/2020 | Chin et al. | |
| 10,874,415 B2 | 12/2020 | Orphanos et al. | |
| 11,751,896 B2 | 9/2023 | Orphanos et al. | |
| 2002/0188299 A1 * | 12/2002 | Reiley | A61B 17/320758 606/79 |
| 2003/0032863 A1 | 2/2003 | Kazakevich | |
| 2003/0229366 A1 | 12/2003 | Reggie et al. | |
| 2004/0133228 A1 | 7/2004 | Bayer | |
| 2004/0147909 A1 * | 7/2004 | Johnston | A61M 1/842 606/1 |
| 2004/0158143 A1 | 8/2004 | Flaherty et al. | |
| 2004/0204725 A1 | 10/2004 | Bayer | |
| 2004/0243167 A1 | 12/2004 | Tanaka et al. | |
| 2005/0154262 A1 | 7/2005 | Banik et al. | |
| 2005/0159764 A1 | 7/2005 | Kasahara et al. | |
| 2005/0192613 A1 | 9/2005 | Lindsay | |
| 2005/0272975 A1 | 12/2005 | McWeeney et al. | |
| 2006/0094930 A1 | 5/2006 | Sparks et al. | |
| 2006/0095056 A1 | 5/2006 | Douglas et al. | |
| 2006/0271032 A1 | 11/2006 | Chin et al. | |
| 2006/0271038 A1 | 11/2006 | Johnson et al. | |
| 2006/0271082 A1 * | 11/2006 | Kirchhevel | A61B 17/32002 606/170 |
| 2007/0016183 A1 | 1/2007 | Lee et al. | |
| 2007/0142711 A1 | 6/2007 | Bayer et al. | |
| 2007/0225556 A1 | 9/2007 | Ortiz et al. | |
| 2008/0195128 A1 | 8/2008 | Orbay et al. | |

(56) References Cited

U.S. PATENT DOCUMENTS

| | | |
|---|---|---|
| 2008/0208192 A1 | 8/2008 | Kadykowski et al. |
| 2008/0255419 A1 | 10/2008 | Kendale et al. |
| 2008/0306335 A1 | 12/2008 | Lau et al. |
| 2009/0023986 A1 | 1/2009 | Stewart et al. |
| 2009/0048486 A1 | 2/2009 | Surti |
| 2009/0079819 A1 | 3/2009 | Abe |
| 2009/0105538 A1 | 4/2009 | VanDam et al. |
| 2009/0299144 A1 | 12/2009 | Shigemori et al. |
| 2009/0318758 A1 | 12/2009 | Farr et al. |
| 2010/0022824 A1 | 1/2010 | Cybulski et al. |
| 2010/0191057 A1 | 7/2010 | Jansen et al. |
| 2010/0198009 A1 | 8/2010 | Farr et al. |
| 2010/0268175 A1 | 10/2010 | Lunsford et al. |
| 2010/0292533 A1 | 11/2010 | Kasahara et al. |
| 2011/0009694 A1 | 1/2011 | Schultz et al. |
| 2011/0046624 A1 | 2/2011 | Lin |
| 2011/0295072 A1 | 12/2011 | Boulais et al. |
| 2012/0149983 A1 | 6/2012 | Chin |
| 2012/0209074 A1 | 8/2012 | Titus |
| 2012/0232342 A1 | 9/2012 | Reydel |
| 2012/0289957 A1 | 11/2012 | Emmerich |
| 2013/0046138 A1 | 2/2013 | McLawhorn |
| 2013/0144276 A1 | 6/2013 | Crisostomo et al. |
| 2013/0165746 A1 | 6/2013 | Chin |
| 2013/0197299 A1 | 8/2013 | Chin et al. |
| 2013/0274548 A1 | 10/2013 | Fels et al. |
| 2014/0296847 A1 | 10/2014 | Chin et al. |
| 2014/0364691 A1 | 12/2014 | Krivopisk et al. |
| 2014/0378957 A1 | 12/2014 | Orphanos et al. |
| 2015/0005580 A1 | 1/2015 | Petersen |
| 2015/0141938 A1 | 5/2015 | Pravongviengkham et al. |
| 2015/0316046 A1 | 11/2015 | Kang et al. |
| 2016/0174810 A1 | 6/2016 | Dresher et al. |
| 2016/0174814 A1 | 6/2016 | Igov |
| 2016/0192822 A1 | 7/2016 | Ofir |
| 2016/0317171 A1* | 11/2016 | Orphanos ........ A61B 17/00008 |
| 2016/0367279 A1 | 12/2016 | Orphanos et al. |
| 2017/0020546 A1 | 1/2017 | Chin et al. |
| 2017/0035487 A1 | 2/2017 | Kadykowski et al. |
| 2017/0188794 A1 | 7/2017 | Ouyang et al. |
| 2017/0354433 A1* | 12/2017 | Nickson ........ A61B 17/320036 |
| 2018/0028213 A1 | 2/2018 | Orphanos et al. |
| 2019/0076161 A1 | 3/2019 | Chin et al. |
| 2019/0343547 A1 | 11/2019 | Orphanos et al. |
| 2020/0113418 A1 | 4/2020 | Levy et al. |
| 2020/0315650 A1 | 10/2020 | Orphanos et al. |
| 2023/0404611 A1 | 12/2023 | Orphanos et al. |
| 2024/0148399 A1 | 5/2024 | Orphanos et al. |
| 2024/0148400 A1 | 5/2024 | Orphanos et al. |

FOREIGN PATENT DOCUMENTS

| | | | |
|---|---|---|---|
| CN | 113784673 | A | 12/2021 |
| EP | 1120129 | A1 | 8/2001 |
| EP | 1570787 | A1 | 9/2005 |
| EP | 1935349 | A2 | 6/2008 |
| EP | 2364653 | A1 | 9/2011 |
| EP | 3310277 | A1 | 4/2018 |
| EP | 3087927 | B1 | 3/2019 |
| EP | 2967629 | B1 | 5/2019 |
| EP | 3310277 | B1 | 5/2021 |
| EP | 3962377 | A1 | 3/2022 |
| JP | H03064603 | U | 6/1991 |
| JP | 7178108 | H | 7/1995 |
| JP | 7184846 | H | 7/1995 |
| JP | 2000505315 | A | 5/2000 |
| JP | 2000217924 | A | 8/2000 |
| JP | 2002543893 | A | 12/2002 |
| JP | 2003500152 | A | 1/2003 |
| JP | 2003190171 | A | 7/2003 |
| JP | 2005246058 | A | 9/2005 |
| JP | 2009519109 | A | 5/2009 |
| JP | 2010534531 | A | 11/2010 |
| JP | 2012511357 | A | 5/2012 |
| JP | 2012147968 | A | 8/2012 |
| JP | 2016514016 | A | 5/2016 |
| JP | 2016209549 | A | 12/2016 |
| JP | 6283091 | B2 | 2/2018 |
| JP | 2018518283 | A | 7/2018 |
| JP | 6486862 | B2 | 3/2019 |
| JP | 2022531272 | A | 7/2022 |
| JP | 7624125 | B2 | 1/2025 |
| WO | 2000067828 | A1 | 11/2000 |
| WO | 2002001998 | A2 | 1/2002 |
| WO | 2003013367 | A2 | 2/2003 |
| WO | 2004043530 | A1 | 5/2004 |
| WO | 2006127241 | A2 | 11/2006 |
| WO | 2009015396 | A2 | 1/2009 |
| WO | 2009148809 | A1 | 12/2009 |
| WO | 2011130399 | A1 | 10/2011 |
| WO | 2014158613 | A1 | 10/2014 |
| WO | 2015191816 | A1 | 12/2015 |
| WO | 2016205514 | A1 | 12/2016 |
| WO | 2017147001 | A1 | 8/2017 |
| WO | WO-2020223463 | A1 | 11/2020 |

OTHER PUBLICATIONS

International Search Report and Written Opinion issued in International Application No. PCT/US2015/035266 mailed Sep. 11, 2015.
International Search Report and Written Opinion issued in International Application No. PCT/US2016/037873 mailed Sep. 8, 2016.
International Search Report issued in International Patent Application No. PCT/US2020/026594 mailed Jun. 19, 2020.
International Search Report issued in International Patent Application No. PCT/US2020/030674 mailed Aug. 4, 2020.
Partial Supplemental European Search Report issued in European Application No. 14773921.3 mailed Nov. 10, 2016.
Extended European Search Report issued in European Application No. 20799040.9 mailed Dec. 22, 2022.
"U.S. Appl. No. 19/023,168, Preliminary Amendment filed Jan. 24, 2025", 6 pgs.
"European Application Serial No. 20799040.9, Response filed Jul. 20, 2023 to Extended European Search Report mailed Dec. 22, 2022", 11 pgs.
"European Application Serial No. 20799040.9, Response to Communication pursuant to Rules 161(2) and 162 EPC filed Jun. 8, 2022", 8 pgs.
"International Application Serial No. PCT/US2020/030674, International Preliminary Report on Patentability mailed Nov. 11, 2021", 7 pgs.
"Japanese Application Serial No. 2021-564652, Notification of Reasons for Rejection mailed Mar. 19, 2024", W/English Translation, 13 pgs.
"Japanese Application Serial No. 2021-564652, Notification of Reasons for Rejection mailed Dec. 12, 2023", W/English Translation, 12 pgs.
"Japanese Application Serial No. 2021-564652, Response filed Mar. 5, 2024 to Notification of Reasons for Rejection mailed Dec. 12, 2023", W/English Claims, 16 pgs.
"Japanese Application Serial No. 2021-564652, Response filed Jun. 18, 2024 to Notification of Reasons for Rejection mailed Mar. 19, 2024", W/English Claims, 14 pgs.
"Japanese Application Serial No. 2021-564652, Response filed Oct. 17, 2024 to Decision of Rejection mailed Jul. 16, 2024", W/ English Claims, 10 pgs.

* cited by examiner

UNITARY ENDOSCOPIC VESSEL HARVESTING DEVICES WITH A VISUAL CUE TO IDENTIFY ORIENTATION OF CUTTING ELEMENTS

CROSS-REFERENCE TO RELATED APPLICATION(S)

This application claims priority to, and the benefit of, co-pending U.S. Provisional Application No. 62/841,413, filed May 1, 2019, for all subject matter common to both applications. The disclosure of said provisional application is hereby incorporated by reference in its entirety.

TECHNICAL FIELD

The presently disclosed embodiments relate to endoscopic cannulas and methods of their use. In particular, the present invention relates to a unitary endoscopic vessel harvesting devices with a visual cue to identify orientation of cutting elements.

BACKGROUND

Vessel harvesting is a surgical technique that is commonly used in conjunction with coronary artery bypass surgery. During a bypass surgery, blood is rerouted to bypass blocked arteries to restore and improve blood flow and oxygen to the heart. The blood may be rerouted using a bypass graft, where one end of the by-pass graft is attached to a blood source upstream of the blocked area and the other end is attached downstream of the blocked area, creating a "conduit" channel or new blood flow connection bypassing the blocked area. Commonly, a surgeon will remove or "harvest" healthy blood vessels from another part of the body to create the bypass graft. The success of coronary artery bypass graft surgery may be influenced by the quality of the conduit and how it is handled or treated during the vessel harvest and preparation steps prior to grafting.

Vessel harvesting methods involve selecting a vessel, traditionally, the great saphenous vein in the leg or the radial artery in the arm to be used as a bypass conduit sealing off and cutting smaller blood vessels that branch off the main vessel conduit and harvesting the main conduit from the body. This practice does not harm the remaining blood vessel network, which heals and maintains sufficient blood flow to the extremities, allowing the patient to return to normal function without noticeable effects.

Minimally invasive technique for vessel harvesting is known as endoscopic vessel harvesting, a procedure that requires only small incisions. While the endoscopic vessel harvesting procedure is an improvement over a traditional "open" procedure that required a single, long incision from groin to ankle, the endoscopic procedure is still cumbersome and difficult. In particular, current endoscopic harvesting systems require multiple tools, which increases the potential for injury to the bypass conduit as well as increases the duration of the procedure. Accordingly, improvements in systems and methods for endoscopic vessel harvesting are still needed.

SUMMARY

Unitary endoscopic vessel harvesting devices are disclosed. In some embodiments, such devices comprise an elongated body having a proximal end and a distal end, a tip with a visual cue designating a location at least one cutting portion, the tip disposed at the distal end of the elongated body; and a cutting unit having a first cutting portion (i.e. cutting blade or cutting member) and a second cutting portion, the first cutting portion and the second cutting portion being moveable in a longitudinal direction relative to the elongated body to capture a blood vessel between the first cutting portion and the second cutting portion, and being rotatable relative to one another circumferentially about the tip to cut the captured blood vessel, finally a biasing member engaged with the cutting unit to bias at least one cutting portion toward the other cutting portion.

In accordance with example embodiments of the present invention, a surgical device is provided. The surgical device includes an elongated body terminating in a tip at a distal end of the body and a cutting unit having a first cutting portion and a second cutting portion moveable in a longitudinal direction relative to the elongated body toward the distal end, at least one cutting portion being rotatable relative to the other cutting portion circumferentially about the tip. The device can also include a visual cue on the tip to designate a location of at least one cutting portion when it is moved longitudinally over the tip at the distal end of the elongated body.

In accordance with aspects of the present invention, the first cutting portion and the second cutting portion move in the longitudinal direction from a retracted position to an extended position over the tip. The visual cue can be at least one of an indentation, protrusion, and marking. The visual cue can be at least one of a vertical line, a horizonal line, an arrow, a dot, and a dotted line. The first cutting portion can be rotatable as a blade and the second cutting portion being static as an anvil. The visual cue can indicate where the anvil will extend in the longitudinal direction from the elongated body. The visual cue can be in a field of view of an operator and visualizeable on an electronic display. The visual cue can be located on one of an internal surface of the tip or an external surface of the tip.

In accordance with aspects of the present invention, the surgical device further includes a biasing member configured to move the cutting portions from an open position where the cutting portions are spaced away from one another to a closed position where the cutting portions are in contact with one another. The surgical device can further include a rotation control collar disposed at the proximal end of the elongated body for moving the cutting portions from the closed position to the open position, and the biasing member is coupled to the rotation control collar to return the cutting portions to the closed position. The first cutting portion and the second cutting can be configured to be energized for sealing, cutting or both of a captured blood vessel therebetween. The first cutting portion can have a sharpened edge and an edge of the second cutting portion facing the sharpened edge of the first cutting portion is flat. The first cutting portion can be stationary and the second cutting portion can be rotatable about the tip away the first cutting portion. The second cutting portion can be bi-directionally rotatable about the tip. The tip can include a stiff transition element having a cut-out to permit the cutting portions to extend therethrough.

In accordance with example embodiments of the present invention, method for harvesting a blood vessel is provided. The method includes advancing an elongated body having, at its distal end, a dissection tip along a main vessel to separate the main vessel and its branch vessels from surrounding tissue and orientating a visual cue on the dissection tip for visual confirmation for positioning of the dissection tip. The method also includes moving a first cutting portion and a second cutting portion towards the distal end while using the visual cue as a point of reference to capture a blood vessel between the first and second cutting portions.

In accordance with aspects of the present invention, the method further includes moving the first cutting portion and the second cutting portion in the distal direction relative to one another. The step of moving, the first and the second cutting portions can be in a closed position in contact with one another and are biased toward one another. The method can further include sealing the blood vessel with a first RF electrode supported by the first cutting portion and a second RF electrode supported by the second cutting portion. The method, can further include capturing a blood vessel between the first cutting portion and the second cutting portion and rotating at least one of the first cutting portion and the second cutting portion. The step of rotating, the first cutting portion is stationary and the second cutting portion is bi-directionally rotatable about the tip. The step of rotating, the first cutting portion has a sharpened edge and an edge of the second cutting portion facing the pointed edge of the first cutting portion is flat.

Further features and advantages will become more readily apparent from the following detailed description when taken in conjunction with the accompanying drawings.

BRIEF DESCRIPTION OF DRAWINGS

The presently disclosed embodiments will be further explained with reference to the attached drawings, wherein like structures are referred to by like numerals throughout the several views. The drawings shown are not necessarily to scale, with emphasis instead generally being placed upon illustrating the principles of the presently disclosed embodiments.

Figure 1A:
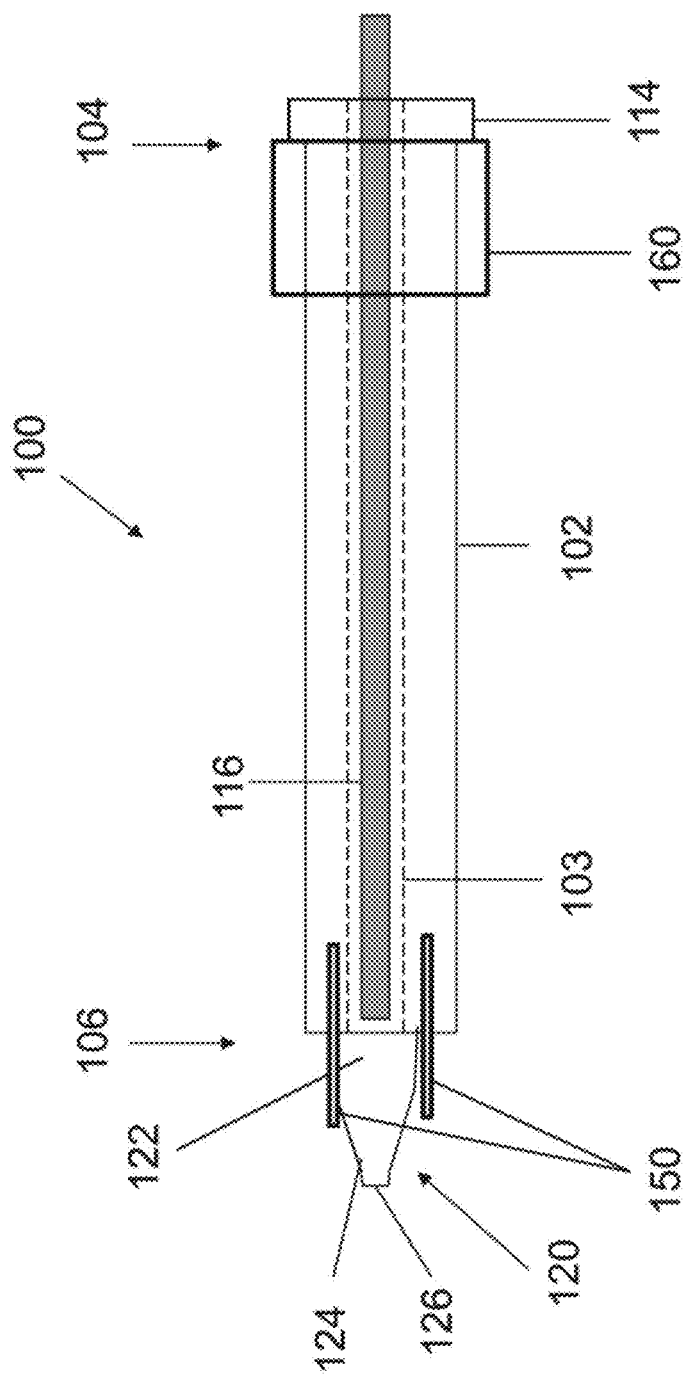
FIG. 1A illustrates a side view of an embodiment of an endoscopic cannula of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems, processes, and other elements in the invention may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

The present disclosure provides a unitary device for endoscopic vessel harvesting. Present systems for endoscopic vessel harvesting contain multiple components. Typically, an endoscopic dissection device is used to isolate the main vessel from the surrounding connective tissue by dissecting the main vessel from surrounding connective tissue. An endoscopic cannula is then used to introduce yet another device, an endoscopic tributary sealing instrument, to seal and sever side branches. Once the side branches are sealed, yet another device is used to harvest a section of the main vessel to be used as a bypass graft. The unitary devices of the present disclosure combine the dissection function, the tributary sealing and severing function, and, optionally, main vessel sealing and severing function, which can result in decreased vessel manipulation and improvement in ease of the procedure. The devices of the present disclosure may also be used to extract the sealed and severed main vessel from the patient.

Decreased vessel manipulation may decrease the potential for injury to the graft. Repeated vessel contact with multiple passes of harvesting instrumentation increases potential vessel injury. A unitary device such as the device of the present disclosure may dissect, i.e., separate the main vessel, from surrounding tissue, cauterize and transect the tributaries and the main vessel as the device is advanced, and the vessel may be harvested with a single passage of the device, rather than multiple device insertions and retractions. Such a device with a decreased diameter may be used for dissection as well as tributary ligation; graft trauma should be decreased. The relative smaller diameter of the present device can also facilitate harvesting of more tortuous vessels; for example, the internal mammary artery.

Referring to FIG. 1A, an endoscopic cannula 100 of the present disclosure includes an elongated body 102 having a proximal end 104 and a distal end 106, terminating with a dissection tip 120. The cannula 100 further includes an cutting unit 150 disposed about the distal end 106 for sealing and cutting a blood vessel and a control handle 160 for controlling the cutting unit 150. The cutting unit 150 includes an elastic device that provides an elastic force during operation of the cutting unit 150. The elastic device may be external or internal to the endoscopic cannula 100.

In some embodiments, the elongated body 102 is configured for passing extravascularly through an entry incision to a vessel harvesting site. To aid in navigating the elongated body 102 to a site of harvesting, the elongated body 102 may be sufficiently rigid axially along its length. To provide the elongated body 102 with such characteristic, in an embodiment, the elongated body 102 may be made from a biocompatible material, such as, plastic material, elastomeric material, metallic material, shape memory material, composite material or any other materials that has the desired characteristics. To the extent desired, the elongated body 102 may be provided with some flexibility to move radially or laterally from side to side depending on the application.

In some embodiments, the elongated body 102 of the cannula 100 may be solid. In other embodiments, the endoscopic cannula 100 may include one or more lumens that accommodate advancing instruments or materials therethrough. In some embodiments, the endoscopic cannula 100 may include an endoscopic lumen 103 through which an endoscope 116 may be advanced for visualizing procedures performed using the cannula 100. The endoscopic cannula 100 may include an adapter 114 at the proximal end 104 for advancing the endoscope 116 into the endoscopic cannula 100. Additional lumens of the cannula 100 are described below.

In some embodiments, the endoscopic cannula or cannula 100 may include a dissection tip 120 disposed at or about the distal end 106 of the endoscopic cannula 100. A viewing tip of the endoscope may be positioned inside the dissection tip 120. In some embodiments, the dissection tip 120 may include an inner cavity in fluid communication with the endoscopic lumen 103 to enable the endoscope 116 to be advanced into the dissection tip 120. In some embodiments, a chip-on-a-tip type of an endoscope may be integrated inside the dissection tip 120. The dissection tip 120 may also be transparent to allow for endoscopic viewing through the tip 120 while procedures are performed using the cannula 100. The dissection tip 120 in some embodiments, may be provided with any shape as long as it facilitates endoscopic viewing therethrough, and allows for necessary control during tissue dissecting, i.e. separation. In some embodiments, the dissection tip may be generally conical.

In some embodiments, the dissection tip 120 may include a generally flat shoulder 122, and a tapered section 124 which terminates in blunt end 126 for atraumatic separation of a vessel segment, being harvested from surrounding tissue, while minimizing or preventing tearing or puncturing of nearby vessels or tissue as the endoscopic cannula 100 is navigated along the vessel segment. Although illustrated as being blunt, it should of course be understood that, to the extent desired, the end 126 of the dissection tip 120 may be made relatively pointed to enhance advancement of the cannula 100. Further the generally flat shoulder 122, and the tapered section 124 may be configured differently structurally, so as to enhance the operability of the cannula 100. For example, the generally flat shoulder 122, and the tapered section 124 may be configured to include one or more other elements that assist in the operation and performance of the cutting unit 150.

Figure 1C:
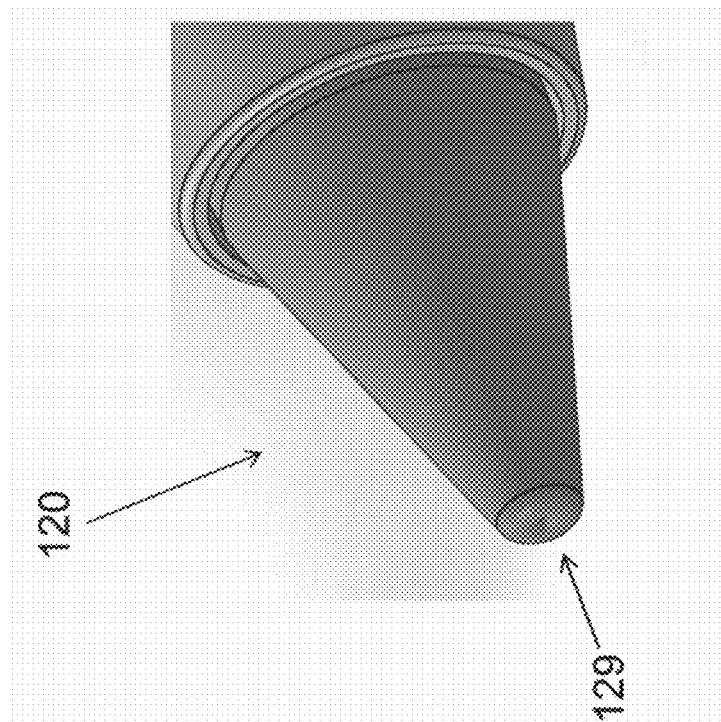
FIG. 1B and FIG. 1C illustrate an embodiment of a dissection tip of the present disclosure having an indent at the distal tip.
Figure 1B:
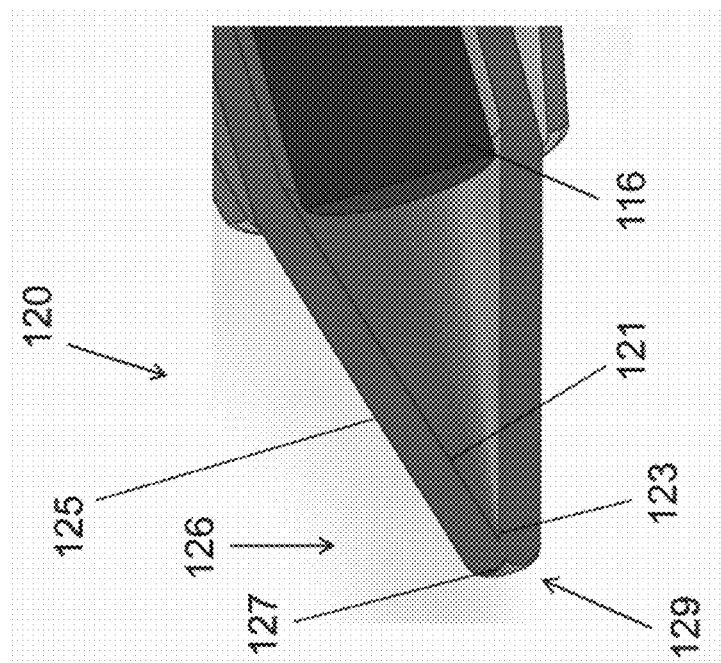

In reference to FIG. 1B and FIG. 1C, in some embodiments, the dissection tip 120 may be cone shaped, and may be shaped at its distal end 129 in a manner so as to minimize the negative effects of visual distortion or blinding at the center of the endoscopic view field when viewing through an endoscope inserted into the cannula 100, with a light source (not shown) and camera system (not shown). Internal surface 121 of the dissection tip 120 may be tapered, with a relatively constant slope toward the distal end 126 of the dissection tip 120, terminating at an internal apex 123, which may be a sharp point, as shown in FIG. 1C. External surface 125 of the dissection tip 120 may also be tapered with a constant slope toward the distal end 126 of the dissection tip 120; however, at the distal end 126, a relatively rounded, blunt end may be formed to minimize tissue damage during dissection.

As illustrated, at the distal end 106, the external surface 125 of the dissection tip 120 may be folded back on itself in a proximal direction to then terminate at an external apex 127, maintaining the blunt exterior surface and forming an indent in the distal end of the dissection tip 120. Both the internal apex 123 and the external apex 127 may be collinear with the central longitudinal axis of the cannula 100 and, thus, in some embodiments, the endoscope 116. In other words, the centers of the internal apex 123 and the external apex 127 are located on the central longitudinal axis of the cannula 100. By providing an apex on each of the internal surface 121 and the external surface 125 of the dissection tip 120 that are also collinear with the axis of the endoscope 116, those surfaces perpendicular to the light path (which is parallel to the endoscope axis) may be eliminated, which then may eliminate light refraction from the perpendicular surface back into the camera and, thus, may minimize or eliminate the visual distortion or blinding when viewing through the endoscope 116 with a light source and camera system.

Still referring to FIG. 1B and FIG. 1C, to reduce likelihood of trauma during the dissection process, in some embodiments, the dissection tip 120 may be radially pliable, flexible or deformable so that the dissection tip may deflect slightly under exertion of force applied to the dissection tip 120. In some embodiments, the dissection tip 120 is radially compressible so that the walls of the dissection tip 120 can deform under exertion of force normal to the tip surface. To that end, the dissection tip 120 may be formed from thin wall plastic material to enable the dissection tip to flex under load. Suitable materials include, but are not limited to, polycarbonate, polyethylene terephthalate glycol-modified (PETG), polyethylene terephthalate (PET) and other materials that provide enough optical clarity while allowing the dissection tip to flex under load. At the same time, the dissection tip 120 may be provided with sufficient column strength in axial or longitudinal direction to allow dissection of the vessel from the surrounding connective tissue. Other characteristics of the dissection tip 120 are contemplated, such as having variable strengths: (1) in an axial direction versus a longitudinal direction, wherein the axial strength is greater than the longitudinal strength; (2) in a longitudinal direction versus an axial direction, wherein the longitudinal strength is greater than the axial strength; or (3) the axial direction versus a longitudinal direction, wherein the axial strength is approximate the longitudinal strength. It is also possible that the dissection tip 120 may include two or more materials, wherein at least one material can have different material properties, such as elasticity, hardness, tensile strength.

Figure 2A:
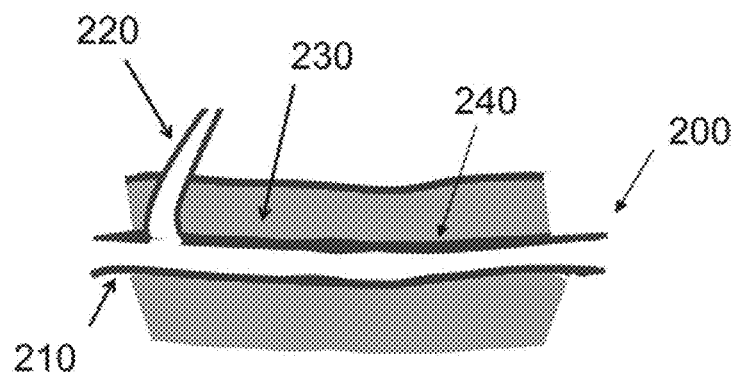
FIGS. 2A, 2B, and 2C illustrate a dissection procedure using an endoscopic cannula of the present disclosure.
Figure 2B:
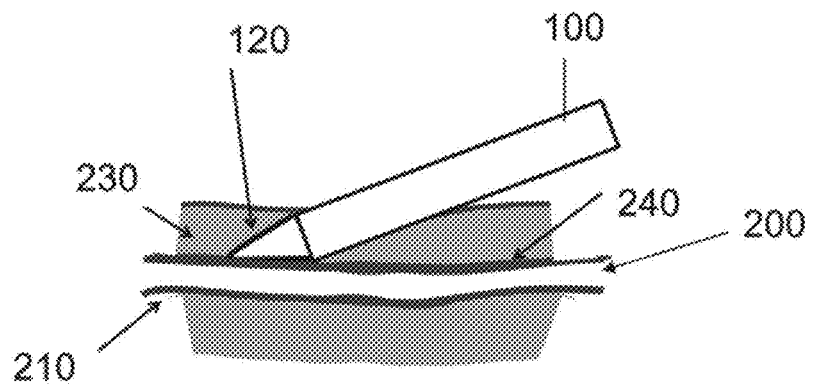
Figure 2C:
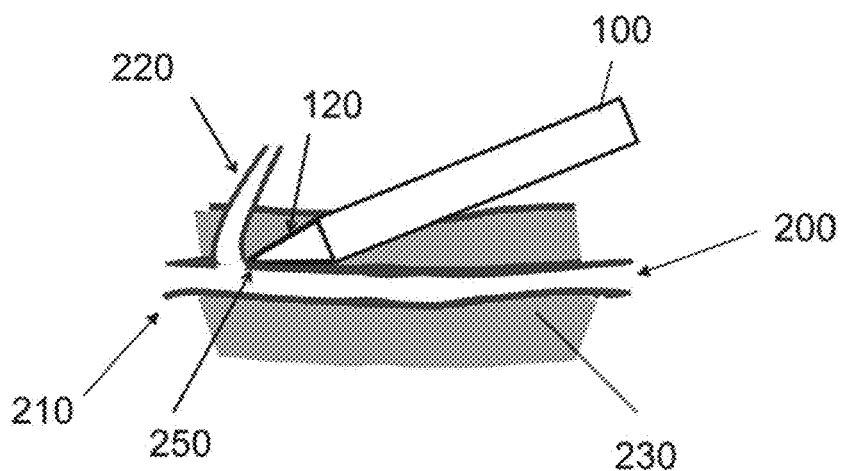

In reference to FIGS. 2A-2C, blood vessels used in bypass grafting (e.g. greater saphenous vein or radial artery), lie in the subcutaneous space, beneath the surface of the skin. The vessel 200 is composed of a main trunk 210, and branch vessels 220 that emanate from the vessel trunk 210, as shown in FIG. 2A. The vessel 200 and its branches 210 are encased in subcutaneous fatty connective tissue 230, and need to be dissected free of the surrounding fatty connective tissue 230 before the main vessel 200 may be harvested. The subcutaneous fat 230 is softer than skin, muscle, fascia or other connective tissues. Although adherent to the vessel 200, the fatty connective tissue 230 forms an interface 240 with the vessel 200 that may be cleanly dissected; that is, there is a natural dissection plane between the outer layer of the vessel 200 (the adventitia), and the surrounding subcutaneous fat 230.

FIG. 2B illustrates dissection of the main trunk 210 of the vessel 200 with the dissection tip 120 along the natural dissection plane, with the dissection tip 120 advanced along the adventitial surface of the vessel 200. Isolation of the vessel 200 from surrounding fatty connective tissue 230 along this plane, typically, does not require high dissection forces. In some embodiments, the dissection tip may 120 be provided with sufficient column strength to dissect the vessel 200 from the surrounding tissue 230 along the natural dissection plane between them.

On the other hand, as is illustrated in FIG. 2C, as the dissection tip 120 approaches a branch vessel 220, the dissection tip 120 may catch the branch vessel 220 at a junction 250 between the branch vessel 220 and the main vessel 200. Application of excessive force with the dissection tip 220 may avulse the branch vessel 220 and sever it from the trunk vessel 210, or may otherwise cause damage to the main vessel 200. To that end, in some embodiments, the dissection tip 120 is provided with sufficient column strength to dissect the vessel 200 from the surrounding tissue 230 along the natural dissection plane between them, while being sufficiently pliable to deform or deflect from the branch vessel 220 with the application of increased force, to decrease the potential of trauma to the graft vessel during dissection around branch vessels. It should of course be understood that the rigidity of the dissection tip 120 may be varied from fully flexible to semi-rigid to rigid, in accordance with requirements of the procedure. The cannula 100 may further include one or more end-effectors for cauterizing or sealing and cutting a blood vessel, either a branch vessel or the main vessel.

Figure 3A:
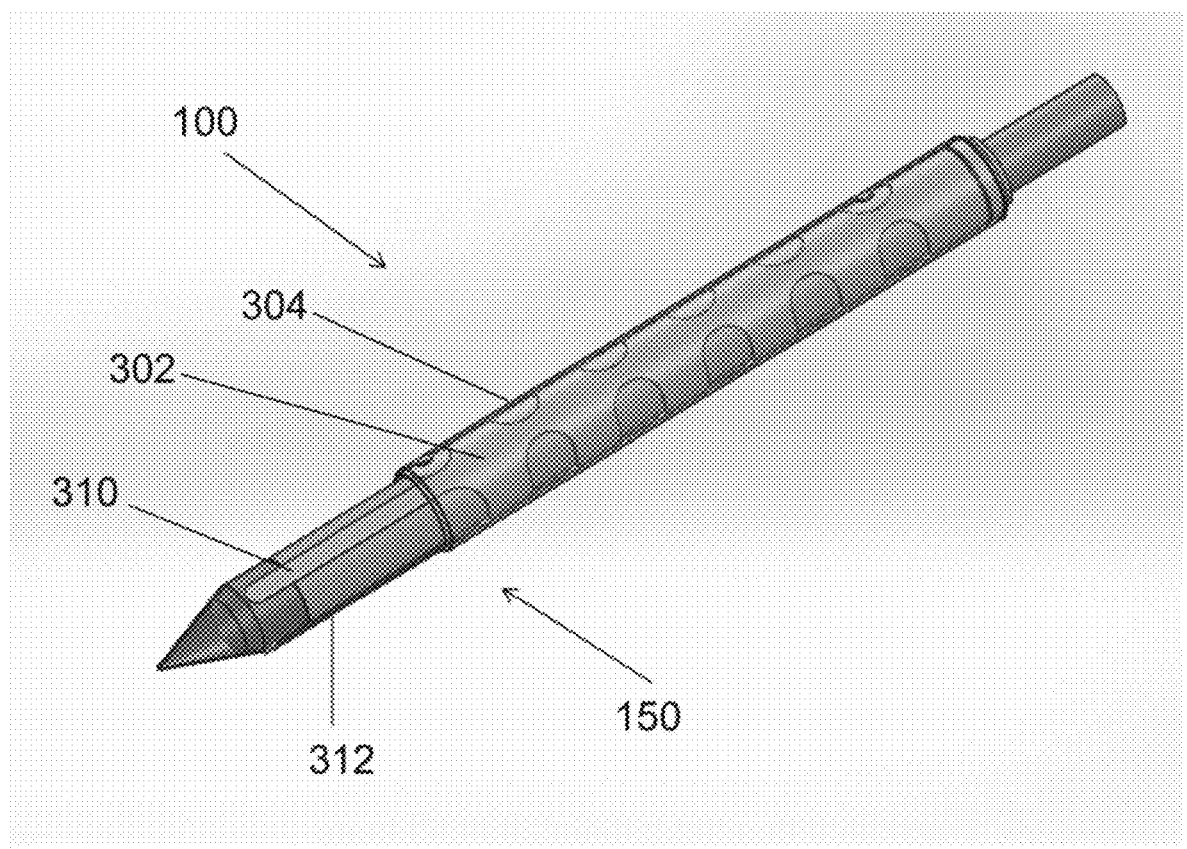
FIG. 3A, FIG. 3B and FIG. 3C illustrate an embodiment of a cutting unit of an endoscopic cannula of the present disclosure.

In reference to FIG. 3A, in some embodiments, the cutting unit 150 of the cannula 100 may include a first cutting member 302 and a second cutting member 304, each having a cutting portion 310, 312 extending from their respective distal ends. In some embodiments, as discussed in more detail below, the cutting portions 310, 312 are biased toward one another.

Figure 3B:
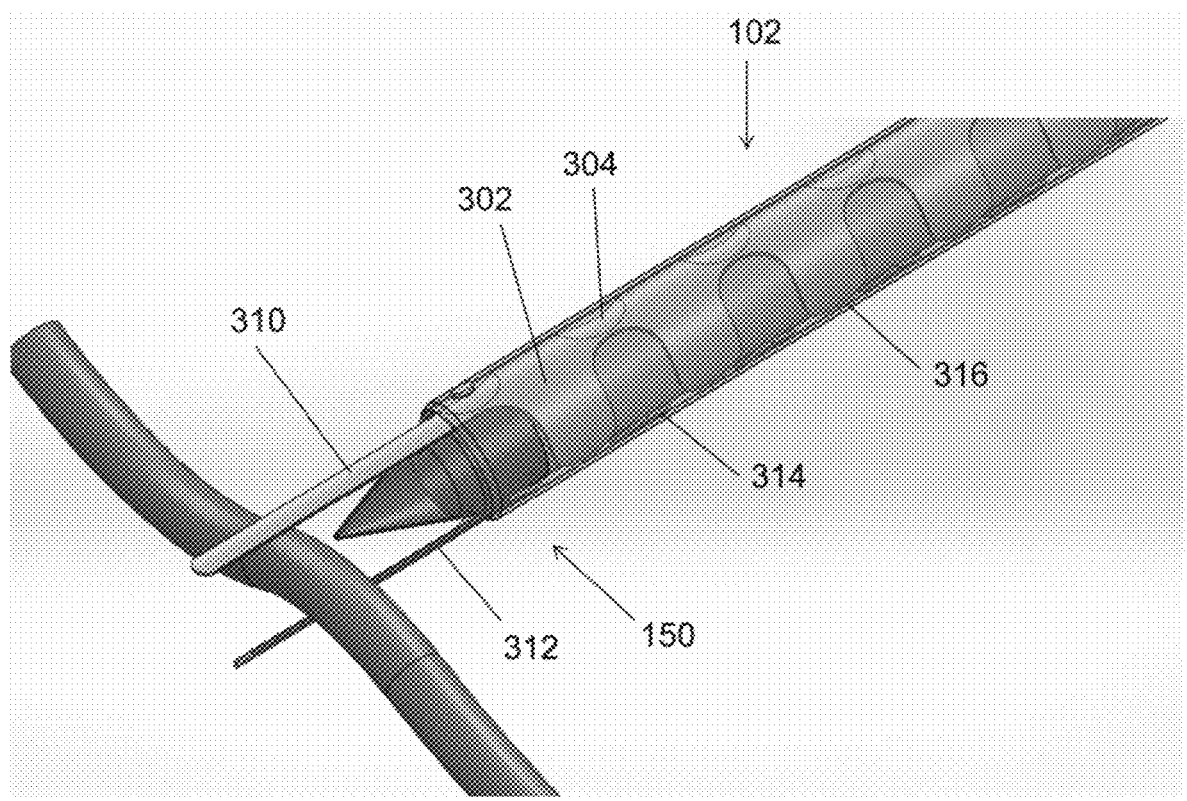
Figure 3C:
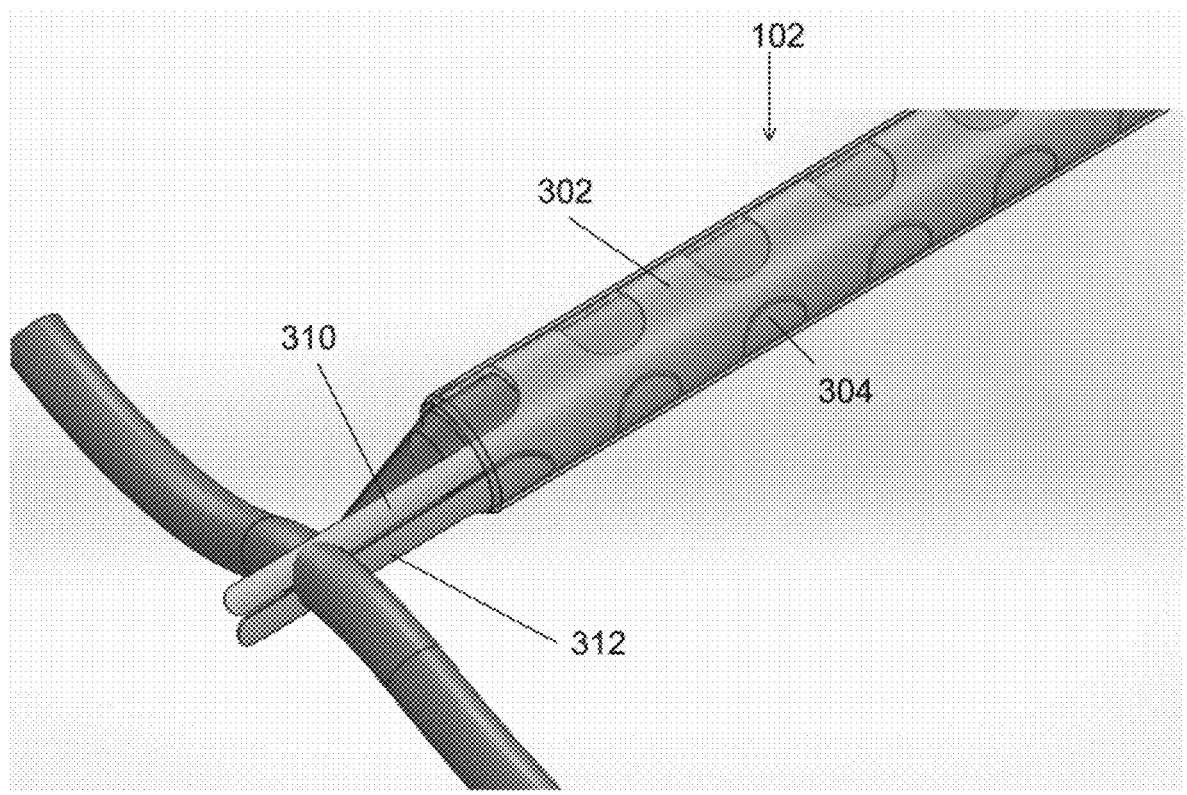

In reference to FIGS. 3A-3C, FIG. 3A shows the cutting unit 150 in its retracted position during dissection. For example, the first cutting member 302 and the second cutting member 304 may be moveable in a longitudinal direction relative to the elongated body 102 of the cannula 100. In this manner, the cutting portions (i.e. cutting blades or cutting members) 310, 312 may be moved from an initial, retracted position during the dissection as in FIG. 3A, in which the cutting portions 310, 312 are retracted substantially proximally of the dissection tip 120 not to interfere with the dissection, to an operational or extended position of FIG. 3B for sealing and cutting, in which the cutting portions 310, 312 may be advanced distally for the user to see the cutting portions and to provide enough capture length for the vessel.

In some embodiments, the cutting portions 310, 312 may at least partially extend beyond the dissection tip 120 to capture a blood vessel the cutting portions 310, 312. In addition, in some embodiments, the first cutting member 302 and the second cutting member 304 may be rotatable relative to one another. In this manner, the cutting portions 310, 312 may be moved from an open position when the cutting portions 310, 312 are apart or spaced away from one another to capture a blood vessel therebetween, as shown in FIG. 3B, to a closed position when the cutting portions 310, 312 are brought towards one another around the dissection tip 120 to seal and cut the blood vessel, as shown in FIG. 3C.

In some embodiments, the first cutting member 302 and the second cutting member 304 are configured so both cutting portions 310, 312 can be rotated circumferentially about the dissection tip 120 toward one another in both clockwise and counterclockwise direction depending on the location of the blood vessel to be captured between the cutting portions 310, 312. Such bi-directional, circumferential movement of the cutting portions 310, 312 may allow the user to operate on blood vessels on all sides of the cannula 100 to save time and reduce cannula manipulation during the procedure as the user does not need to be concerned about the orientation and position of the cannula 100 in relation to the blood vessel. In addition, it may reduce the potential for the cutting portions to twist the side branches, thereby exerting traction on the blood vessel and consequent damage to the graft. The bi-directional movement may also be more-intuitive to the user and eliminates the need to remember which side is the active side for cautery and cutting. In other embodiments, one of the cutting portions 310, 312 may be stationary and the other one may rotate in both clockwise and counterclockwise toward the stationary cutting portion for easier manipulation and visualization of the cutting portions 310, 312. Of course, the stationary cutting portion may also be moved to a desired orientation by moving the cannula 100.

Still referring to FIG. 3A, FIG. 3B and FIG. 3C, the cutting portions (i.e. cutting blades or cutting members) of the cutting members 302, 304 may generally be elliptical or blade-like with a rounded distal tip, but any other shape that enables the cutting and sealing of a blood vessel may also be used. To facilitate sealing of the blood vessel, one or both of the cutting portions 310, 312 may be energized, when needed, using various sources of energy, including, but not limited to, resistive heating, ultrasound heating, and bipolar or monopolar RF energy. In some embodiments, the electrodes can be controlled independently of one another. In some embodiments, the cutting portions 310, 312 may be made from a material such as metal that would enable the cutting portions 310, 312 themselves to be energized. Additionally or alternatively, energizing elements, such as metal wires, may be disposed on the cutting portions 310, 312. When energized, the energizing elements may be brought in contact with the blood vessel by the cutting portions 310, 312 to seal the blood vessel. In some embodiments, one or both of the cutting members 310, 312 may include protrusions for use as spot cautery. In some embodiments, one or both of the cutting members 310, 312 may have a sharpened, thin edge for concentrated application of energy to the blood vessel. Such concentrated energy application may require less energy to be applied to the side branch, thereby minimizing extension of cauterizing energy from the side branch towards the main trunk of the blood vessel, and thus eliminating potential trauma to the blood vessel.

Still referring to FIG. 3A, FIG. 3B and FIG. 3C, to facilitate cutting of the blood vessel subsequent to sealing of the blood vessel, in some embodiments, one of the opposing edges of the cutting portions 310, 312 between which cutting occurs may have a leveled face while the other one may be a sharpened, thin or pointed so that the tissue is not cut in a scissor-like motion but with a thin edge against a flat surface. To that end, in some embodiments, both edges of the cutting members 310 may be sharpened edges, while both edges of the cutting portion 312 may be flat, or vice versa. Alternatively, the cutting portions 310, 312 may have one sharp edge or blade edge and one flat edge with the sharp edge of one cutting portion facing the flat edge of the other cutting portion. It should be noted that in some embodiments, the blood vessel may be both sealed and cut using energy, as described above. It should of course be understood that, in some embodiments, the opposing edges the opposing edges of the cutting portions 310, 312 may both be sharpened so the tissue is cut in a scissor-like manner.

As shown in FIG. 3B and FIG. 3C, in some embodiments, the cutting members 302, 304 may be substantially u-shaped and disposed in the same plane relative to the cannula body 102. In some embodiments, the cutting members 302, 304 may include respective cutouts and fingers 314, 316 along the edges to enable circumferential movement of the cutting members 302, 304 relative to one another as shown in FIG. 3B.

Figure 4A:
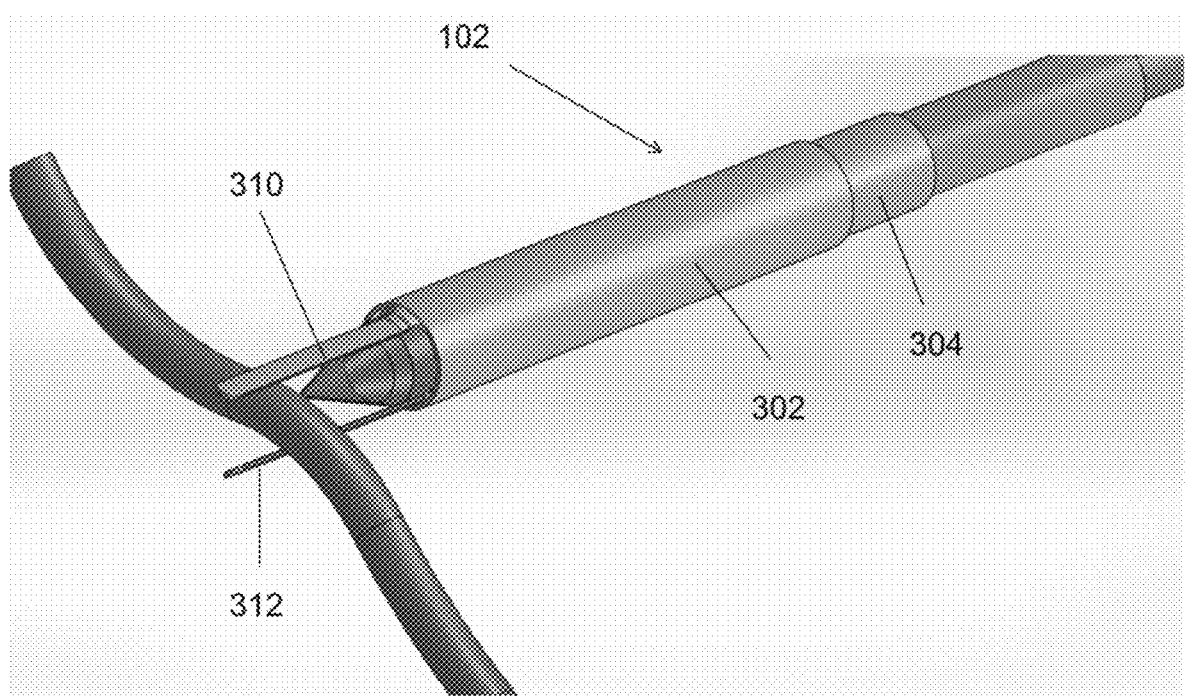
FIGS. 4A, 4B, 4C, and 4D illustrates an embodiment of a cutting unit of an endoscopic cannula of the present disclosure.
Figure 4B:
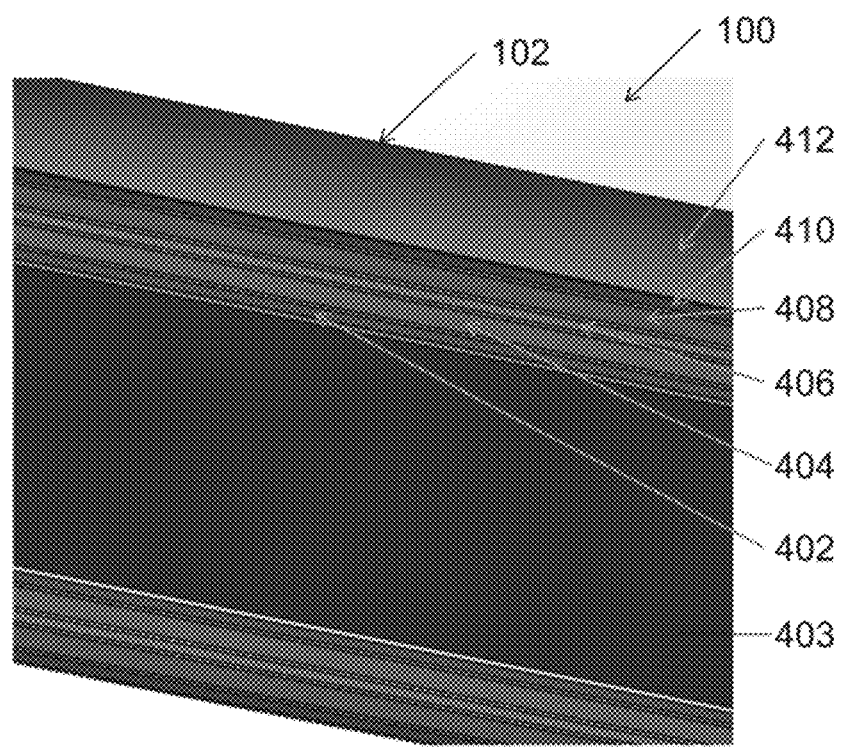

In reference to FIG. 4A and FIG. 4B, in some embodiments, the cutting members 302, 304 may be substantially tubular and be disposed in different planes of the cannula body 102. As shown in FIG. 4A, in some embodiments, the cutting member 304 may be concentrically disposed inside within the cutting member 302. Referring to FIG. 4B, in some embodiments, the elongated body 102 of the cannula 100 may be constructed of a series of coaxial tubes, both metal and plastic, that may act as the structural main shaft, the electrical conductive and insulative paths, and the end-effectors, i.e. cutting portions (i.e. cutting blades or cutting members). In some embodiments, there may be three plastic sheaths acting as electrical insulators and mechanical bearing surfaces sandwiched in between two metal conductive tubes for the entire length of the device. The innermost layer may be the inner sheath 402 (plastic) defining an internal lumen 403. The inner sheath 402 may be followed outwardly by the inner electrode tube 404 (metal), middle sheath 406 (plastic), outer electrode tube 408 (metal) and outer sheath 410 (plastic), and finally a shrink jacket 412. In some embodiments, instead of three plastic sheaths, the electrical insulation may be provided using non-conductive coatings or similar means. For example, in some embodiments, the electrodes 404, 408 may be coated with polyvinyldyne flouride (PVDF), but other non-conductive coating may also be used.

The inner electrode tube 404 may be used to form the first cutting member 302 and the outer electrode tube 408 may be used to form the second cutting member 304, with the cutting portions 310, 312 being formed at the distal ends of the inner electrode tube 404 and the outer electrode tube 408. To enable the cutting portions 310, 312 to capture, seal and cut blood vessels, the inner electrode tube 404 and the outer electrode tube 408 may be slidable in the longitudinal direction relative to the cannula 100 and rotatable relative to one another. Further, because the cutting portions 310, 312 are formed from the inner electrode tube 404 and the outer electrode tube 408, the cutting portions 310, 312 can be easily energized through the inner electrode 404 and the outer electrode 408. In some embodiments, the cutting portion formed from the inner electrode tube 404 (i.e. inner cutting portion 411) may be bent out of the plane of the inner electrode 404 to enable it to rotate along the same axis and be co-radial with the cutting portion formed in the outer electrode 408 (i.e. outer cutting portion 413 of FIG. 4D). In some embodiments, FIG. 4D shows the inner cutting portion 411 may have a flat face 416 on either side of the inner cutting portion, while the outer cutting portion 413 may have a sharpened or blade edge 418 on both sides, or vice versa. In other embodiments, as described above, each cutting portion 411, 413 may have one sharpened edge and one flat edge, with the flat edge of one cutting portion facing the sharpened edge of the other cutting portion.

Figure 4C:
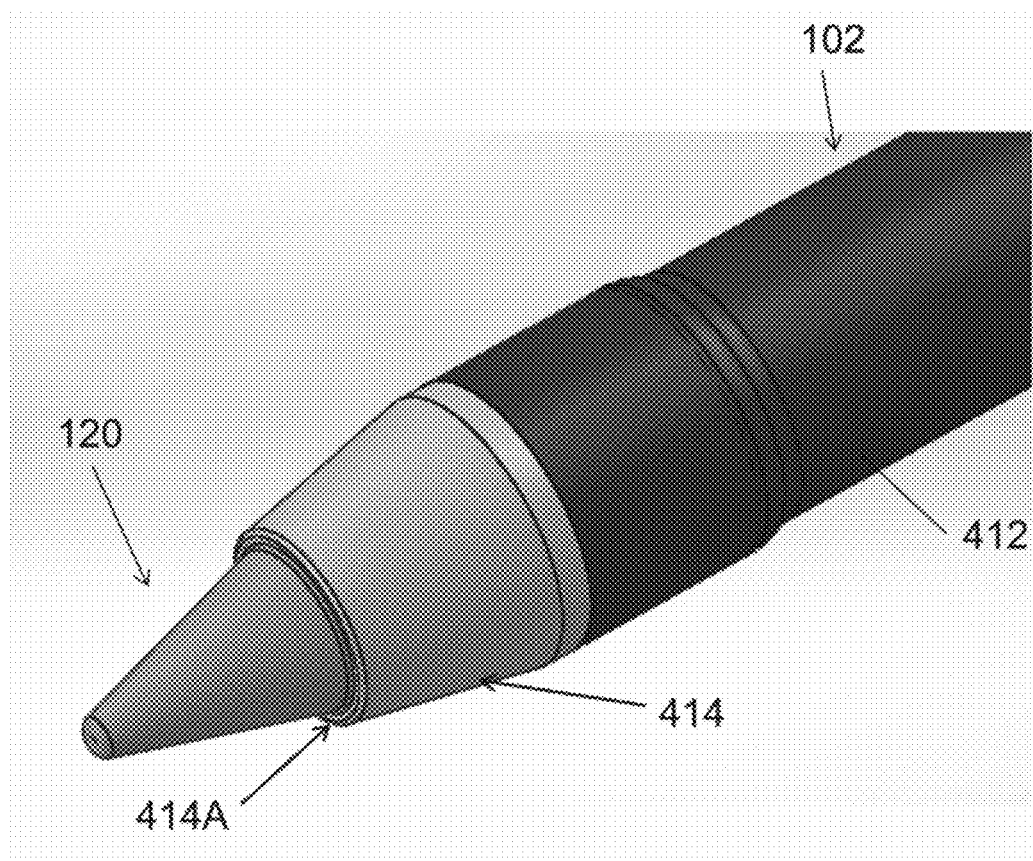
Figure 4D:
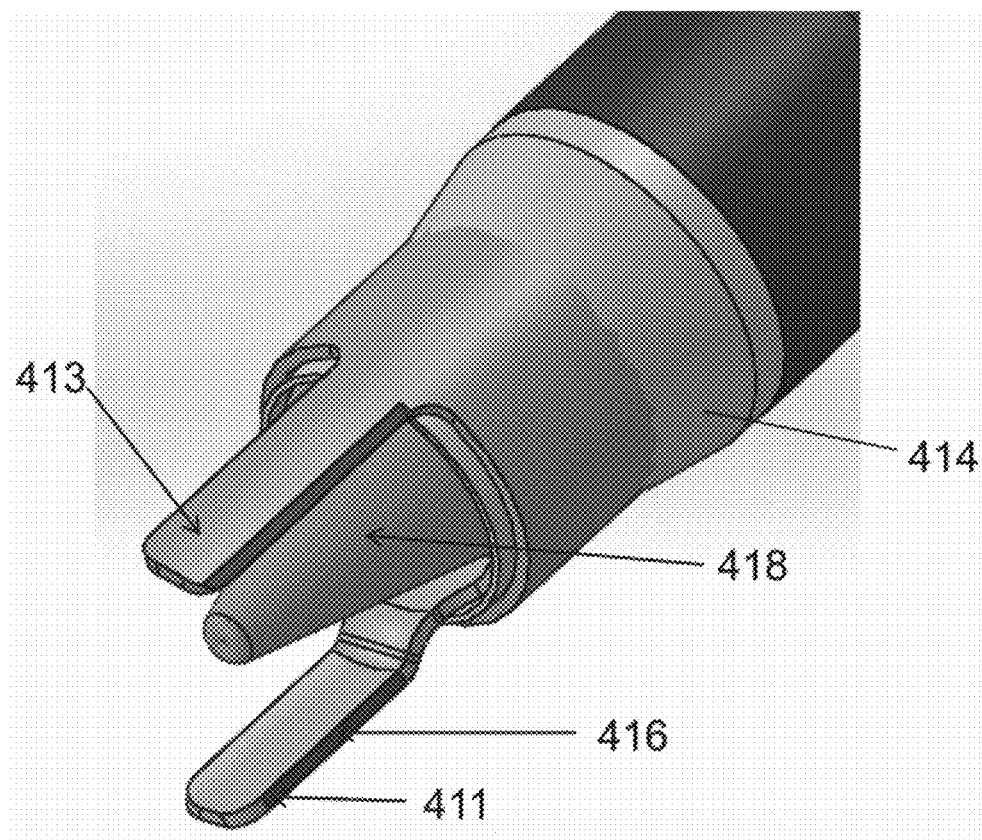

In reference to FIG. 4C, in some embodiments, the dissection tip 120 may be connected to the inner sheath 402 to enable the advancement of the endoscope 116 into the dissection tip though the internal lumen 403. A soft transition element 414 may be used to protect tissue from damage during dissection by smoothing the geometry between the dissection tip 120 and the cannula body 102. The distal end 414A of the transition element 414 may be left unattached to the dissection tip 120 to allow the cutting portions 310, 312 to be advanced distally through the transition element 414, as shown in FIG. 4D. In some embodiments, the transition element 414 may be made of a flexible material so during dissection, the transition element 414 would comply with the dissection tip creating a smooth transition and also a tight seal to prevent tissue or bodily fluids from entering the cannula 100. On the other hand, a flexible sleeve would be able to deflect and expand to allow the cutting portions 310, 312 to be advanced out distally though the transition element 414. In some embodiments, the surface of the sleeve may be coated with a lubricious substance to make the extension of the cutting portions 310, 312 through the transition element 414 easier and smoother by decreasing friction between the cutting portions 310, 312 and the transition element 414. FIG. 4C illustrates that a thin-walled shrink tube 412 may be placed over the outer surface of the cannula body for aesthetic purposes and to assist in securing the transition.

Figure 5A:
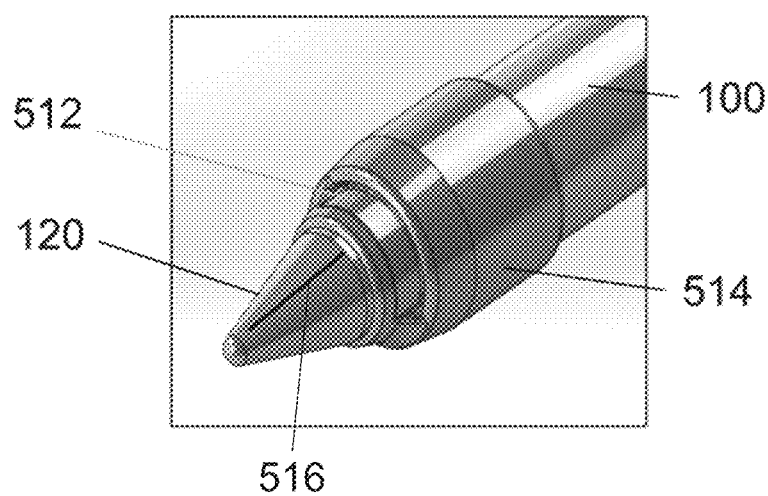
FIGS. 5A, 5B, 5C, 5D, and 5E illustrate an embodiment of a dissection tip of the present disclosure.
Figure 5B:
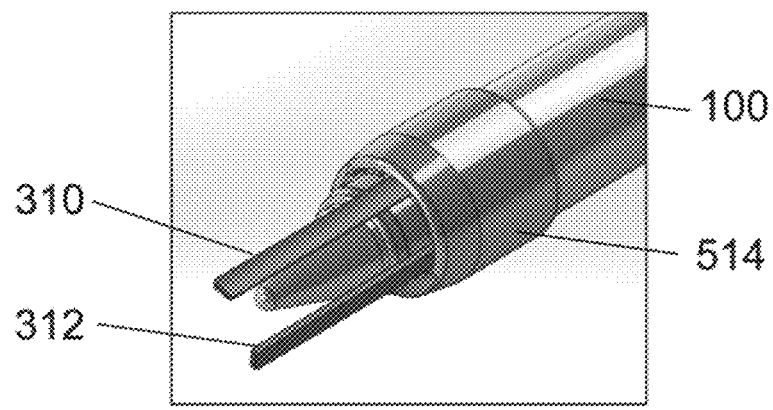

In reference to FIGS. 5A and 5B, in some embodiments, the dissection tip 120 may include a transition element 514 made from a stiff material. The transition element 514 may be configured with an opening or cutout 512 that may allow for the two cutting portions 310, 312 to extend out of the transition element 514 (as shown in FIG. 5B) and cannula 100 and retract into the main cannula 100 (as shown in FIG. 5A). The transition element 514 can be connected to the cannula 100 of the main device and can also rest over the dissection tip 120. The transition element 514 can be coupled to the cannula 100 using any combination of methods. For example, the transition element 514 can be coupled to the cannula 100 using a mechanical connection, adhesive, welding, etc. or a combination thereof. In some embodiments, the dissection tip 120 and the transition element 514 may be integral. In some embodiments, they can be provided as separate parts.

In some embodiments, the profile of the transition element 514 may shaped to create a gradual decrease in diameter toward the distal end to create a tapered shape. The transition element 514 may be constructed from a single formed piece or a combination of shaped coupled together. In some embodiments, the transition element 514 can be constructed of a strong and stiff material that maintains its geometry throughout dissection to reduce the dissection load. For example, during the procedure, due to its stiffness, the transition element 514 may maintain its form and support the tissue sliding over the transition element 514.

Suitable materials for the transition element include, but are not limited, to medical grade metals and hard plastics.

Still referring to FIGS. 5A and 5B, in some embodiments, transition element 514 can include a cutout 512 designed to allow for the two cutting portions 310, 312 to extend out of the transition element 514 (as shown in FIG. 5B). The cutout 512 can be positioned such that it enabled passage of the two cutting portions 310, 312 from within the cannula 100 out through the transition element 514. In some embodiments, the cutout 512 can be a curved cutout extending circumferentially with at least a portion of the transition element 514. For example, the cutout 512 can be shaped to mirror the arc, angle, shape, etc. of the distal end of the cannula 100 and/or the tip 120. In some embodiments, the circumferential length of the cutout 512 may control the extent of rotation of the cutting portions with respect to the dissection tip 120. In some embodiments, the allowable arc of rotation of the cutting portions may be less than a full rotation, depending on the opening of the cutout 512. The cutting portions can be positioned within the cutout 512 and can have single-sided features, that is, the sharp, conductive edge 312 and a flat conductive edge 310 (i.e. anvil) may be situated on the inside edges of the respective cutting portions, but not on the outside edges. This configuration can enable one or both of the cutting elements 310, 312 to be rotated within the cutout 512 to achieve a desired effect (e.g., separation, dissection, etc.).

During operation, the two cutting portions 310, 312 (blade and anvil), when extended, have an angular orientation in the field of view of the operator as the operator looks to the screen representing the view from the endoscope 116 out the cone of the dissection tip 120 of the device 100. In some embodiments, the anvil cutting portion 310 can be "fixed" regarding its angular orientation with respect to the body of the device 100 when they are extended from the cannula 100. When fixed, the anvil cutting portion 310 will always extend out in line with what is considered the "top" of the device 100, or in line with the other user controls such as the slider and the power button. For example, when a user turns the whole body of the device 100, the anvil cutting portion 310 will turn with it as it is fixed to the body internally.

Conversely, the blade cutting portion 312 may not fixed to the body with respect to angular rotation about the dissection tip 120. The blade cutting portion 312 can be rotated about the central axis of the device 100 by turning a "rotator" mechanism (e.g., rotator subassembly 901). The rotator can be configured to spin the blade cutting portion 312 internally while the anvil cutting portion 310 and subsequently the rest of the body of the device 100 remain fixed. This allows the operator to separate the blade cutting portion 312 from the an anvil cutting portion 310 while approaching a branch for cautery. In some embodiments, the cutting portions 310, 312 can both be rotatable about the dissection tip 120. In such instances the internal surface 121 and/or the external surface 125 of the dissection tip 120 can be configured to be rotatable with the cutting portions 310, 312 to keep the visual cue 516 in line with the cutting portions 310, 312.

With the above-noted operations in mind, while the cutting portions 310, 312 are retracted, it is important for the operator to know the angular position of the cutting portions 310, 312 before extending them so than can be sure no damaged is caused by the cutting portions 310, 312 inadvertently making contact with something in front of them.

Figure 5C:
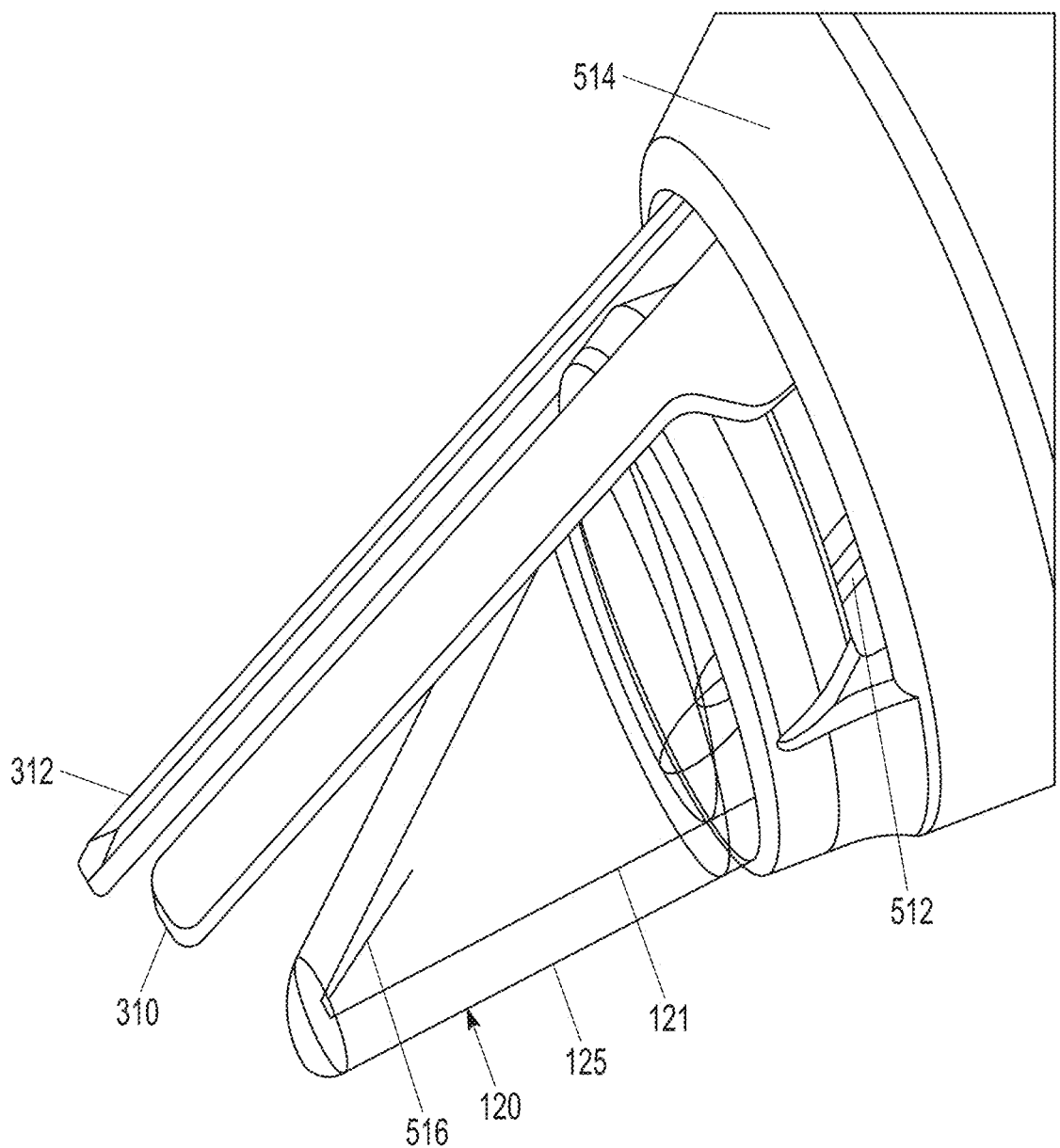
Figure 5D:
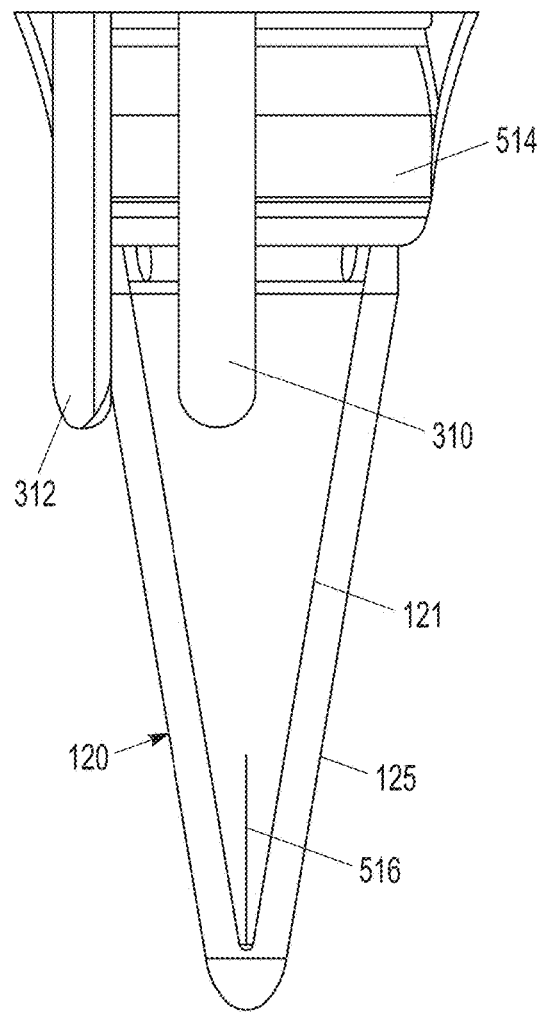
Figure 5E:
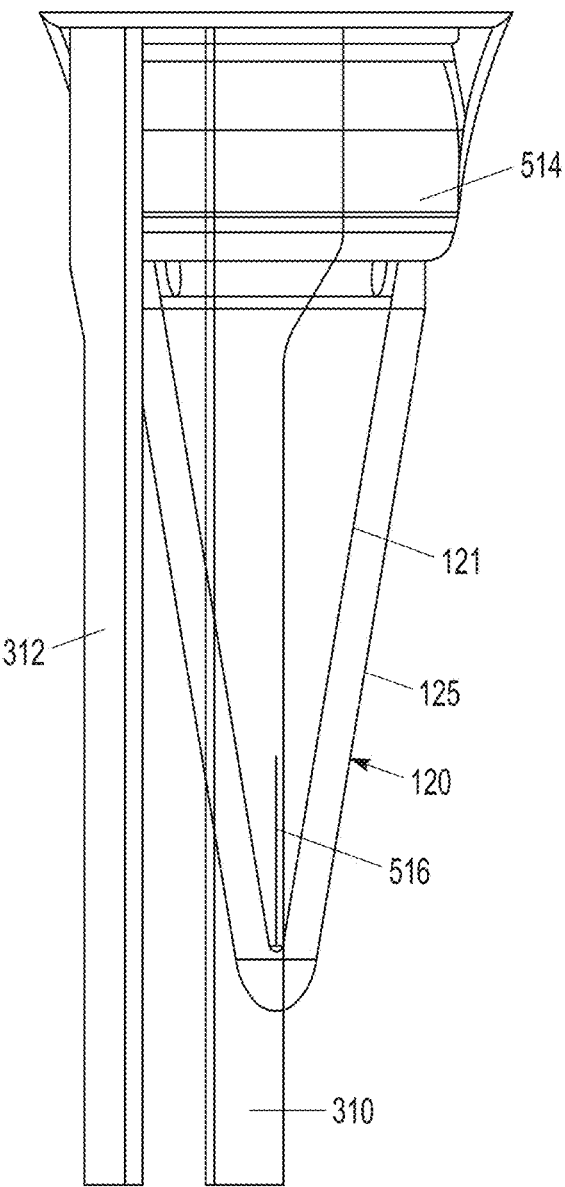

Referring to FIGS. 5C-5E, in some embodiments, the dissection tip 120 may include a visual cue 516 thereon. The visual cue 516 can be configured to designate a point of reference in which a location of at least one of the cutting portions can be discerned in relation to the dissection tip 120, while cutting portions 310, 312 are in their retracted state (e.g., under the transition element 514), as depicted in FIG. 5A. Similarly, the visual cue 516 cam indicate a position that the cutting portions 310, 312 should be located during retraction back into the cannula 100. The visual cue 516 can be designed such that it can be visualized by the human eye, by an imaging device, or a combination thereof.

In some embodiments, the visual cue 516 can be disposed on the external surface 125 of the dissection tip 120, as depicted in FIG. 5A, and/or on the internal surface 121 dissection tip 120, as depicted in FIGS. 5C-5E, which can be visualized through a transparent portion of the tip 120. The visual cue 516 can be any combination of lengths to provide a sufficient indicator to a user as to the orientation of the device and/or locations of the cutting portions 310, 312. For example, the visual cue 516 can extend an entire length of the tip 120, as shown in FIG. 5A, or over a portion of the tip, as shown in FIG. 5C.

Although FIGS. 5A-5E show the visual cue 516 as a solid line, any combination of visual designations can be used without departing from the scope of the present invention. For example, the visual cue 516 can be a vertical line, a horizontal line, an arrow, a dot, a dotted line, a curved line, a plus sign, etc. or a combination thereof. Similarly, the visual cue 516 can be any type of visual designation including a marking substantially flush on a surface of the dissection tip 102, an indentation within one of the surfaces of the dissection tip 102, a protrusion from one of the surfaces of the dissection tip 102, or a combination thereof. Similarly, the visual cue 516 can have any combination of orientations in relation to the rest of the device. For example, the visual cue 516 can be a straight line running longitudinally over the tip 120. Similarly, the visual cue 516 can also be positioned to provide an indication of positioning for at least one of the cutting portions 310, 312.

In some embodiments, the visual cue 516 can be sized, shaped, and colored to be sufficiently visualized but small enough to not cause a significant obstruction in the field of view. The visual cue 516 can be any length without departing from the scope of the present invention, for example, the visual cue 516 can run an entire length of the dissection tip 120, as depicted in FIG. 5A. Similarly, the transparency of the visual cue 516 can vary from barely visibly to completely opaque. In some embodiments, depending on a location of the visual cue 516, the transparency of the dissection tip 120, or portions thereof, can also be varied. In particular, when the visual cue 516 is located on an inside surface 121 of the tip 120 (or within the tip 120 itself), then at least a portion of the outside surface 125 of the tip 120 and/or the tip 120 itself, can be sufficiently transparent to enable the visual cue 516 to be viewed. For example, the visual cue 516 can be created during injection molding on the internal surface 121 of the dissection tip 120, with the dissection tip 120 being transparent to create a slightly frosted visual cue 516 that is identifiable as a small line, as depicted in FIGS. 5C-5E. In some embodiments, the visual cue 516 is sized, shaped, with a length and a width such that is it visible but not obstructive within a field of view. Keeping the length short and the width narrow keeps it out of the way provides a balance in which the visual cue 516 is easy to find in a hurry without being obstructive. When the visual cue 516 does not extend a full length of the tip 120, the visual cue 516 can be placed at the distal end of the tip 120 where it is keeps it visually small and out of the way.

The visual cue 516 can be created using any combination of methodologies or systems known in the art. For example, the visual cue 516 can be created during injection molding of a surface of the dissection tip 120 where the visual cue 516 can be a positive bump, negative cavity, or a disruption in the surface finish to create a contrasting light deflection (such as frosted glass). The visual cue 516 can also be etched into any combination of the outside surface 125 and internal surface 121. Any other combination of marks on any combination of the outside surface 125 and internal surface 121 can also be used. For example, a mark can be painted, embossed, etc. onto any combination of the outside surface 125 and internal surface 121. Any combination of methods can be combined to create the visual cue 516.

The visual cue 516, in some embodiments, can be designed to be visualized on a digital display (e.g., video screen) via data from an endoscope 116 and can be used to identify the angular location of the cutting portions 310, 312 while they are in a retracted position. Providing visualization of the visual cue 516 on a screen may make it easier for the brain of a user to process the visual cue 516 in the field of vision on a digital display rather than for the brain to process other cues which they are not looking, such as for example, a tactile cue. In some embodiments, the visual cue 516 can be designed for enhanced visualization based on the imaging system being used. For example, the visual cue 516 can have an contrast based coating for viewing in a fluoroscopic system.

Regardless of design, in some embodiments, a visual cue 516 designed to appear on a digital display can be oriented in its most simple sense to locate the position of the anvil cutting portion 310. For example, a mark on the dissection tip 120 would be seen by the operator through the endoscope 116 or other camera for projection on a digital display to identify exactly where the anvil cutting portion 310 is (longitudinally behind the visual cue 516 out while the cutting portions 310, 312 are retracted). Thus, a user can expect, upon extending the cutting portions 310, 312, that the anvil cutting portion 310 will exit the housing exactly where the visual cue 516 on the dissection tip 120 is located. The user also knows that the blade cutting portion 210 is always positioned adjacent to the anvil cutting portion 310 in the clockwise or counter-clockwise direction.

Referring to FIGS. 5D and 5E exemplary views of the cutting portions 310, 312 extending from the housing of the device 100 are depicted. As shown in FIGS. 5D and 5E, the anvil cutting portion 310 can be axially aligned up with the visual cue 516 to provide an indication of the angular orientation of the anvil cutting portion 310. Thus, when relying on the visual cue 516 to project where the anvil cutting portion 310 (and blade cutting portion 312 based on relationship to the anvil cutting portion 310) will extend from the housing, out of the cutouts 512, and over the visual cue 516. Similarly, The user also knows that the blade is always positioned adjacent to the anvil in the clockwise direction. Using this configuration, the user can accurately deploy the cutting portions 310, 312 without concern that the cutting portions 310, 312 will inadvertently collide with unintended portions of the body. In some embodiments, the tip 120 can include a plurality of visual cues 516. For example, the tip 120 can include a separate visual cue 516 for the cutting portion 310 and a separate visual cue 516 for the cutting portion 312.

In some embodiments, at least one of the cutting portions 310, 312 can be constructed from a substantially transparent material to allow visualization of the visual cue 516 when the cutting portions 310, 312 are positioned over the visual cue 516. Similarly, at least one of the cutting portions 310, 312 can include a visual cue (not depicted) thereon that mirrors the visual cue 516 on the tip 120. In some embodiments, the visual cue 516 can be combined with other forms of feedback. In one example, tactile responses, such as small ridges that can be felt by an operator, can be combined with the visual cue 516 to provide two forms of confirmation. The tactile feedback can include any combination of methods. For example, there can be multiple ridges with one affixed to the rotator and will signify the angular position of the cutting portion 312 and the other is affixed to the body of the device to signify the angular position of the cutting portions 310. In this way, the operator need not remove their focus on the video screen in order to look at the device and locate these features. While the operator is looking at the screen, they simply feel the small ridges with their hands.

Figure 6A:
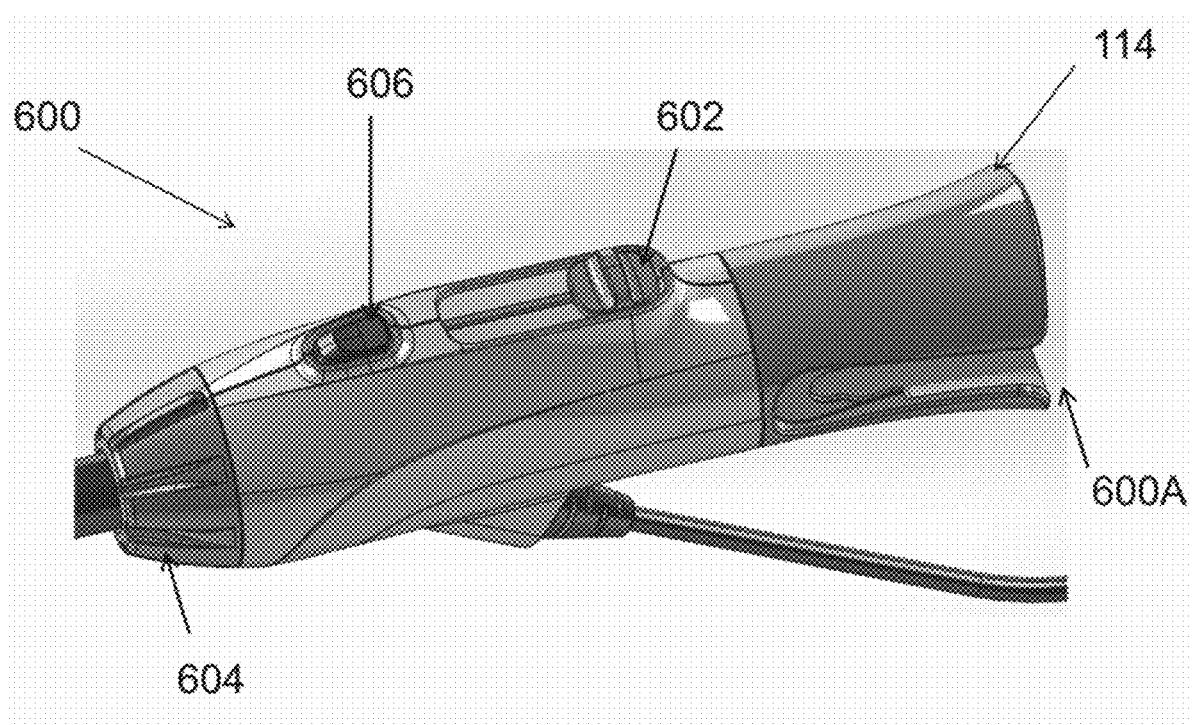
FIG. 6A illustrates an embodiment of a control handle suitable for use with an endoscopic cannula of the present disclosure.
Figure 6B:
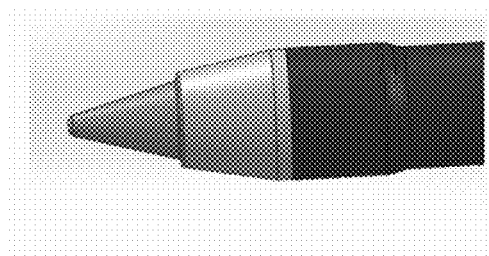
FIGS. 6B, 6C, 6D, 6E, 6F, and 6G illustrate an embodiment of an endoscopic cannula of the present disclosure in operation being controlled by the control handle of FIG. 5.
Figure 6C:
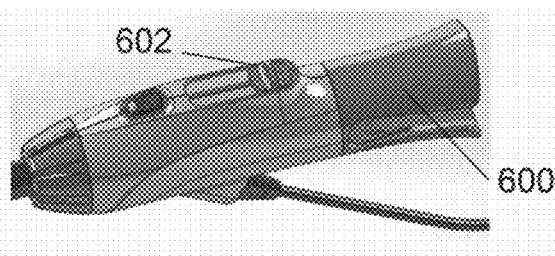

In reference to FIG. 6A, a control handle 600 may be provided at the proximal end of the cannula 100 for controlling the cutting members. In some embodiments, the control handle 600 may include a translation control 602 for advancing and retracting the cutting members. The control handle 600 can further include a rotation control collar 604 for rotating the cutting members with respect to one another. The control handle 600 can also include an energy control 606 for supplying energy (such as bipolar radiofrequency (RF) energy) to the cutting portions of the cutting members. In some embodiments, an adapter 114 may be located at the proximal end 600A of the control handle 600 for advancing an endoscope into the cannula.

The operations of the device may be described in reference to FIGS. 6A-6G. In operation, an initial incision may be made in conventional manner to expose the target vessel (e.g., the saphenous vein). The cannula 601 (FIG. 7B) may be inserted into the incision and guided to the target vessel. In some embodiments, the cannula 601 may include a smooth tubular sheath around the elongated body for sealing the cannula 601 within the port through which the cannula 601 is introduced into the patient. The cannula 100 may then be advanced substantially along the target vessel to dissect the target vessel from the surrounding tissue. In some embodiments, the cannula 601 may be introduced through a sealable port used to seal the incision to allow insufflation of the space created by the dissection of the target vessel from surrounding tissues.

Figure 6D:
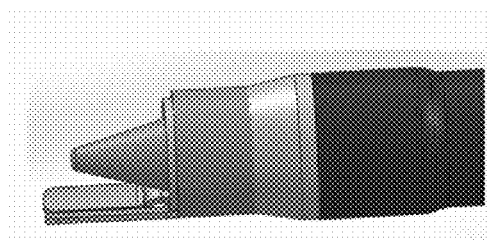
Figure 6E:
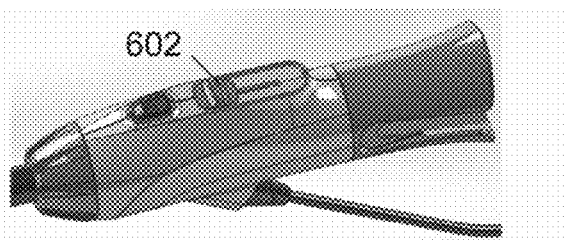
Figure 6F:
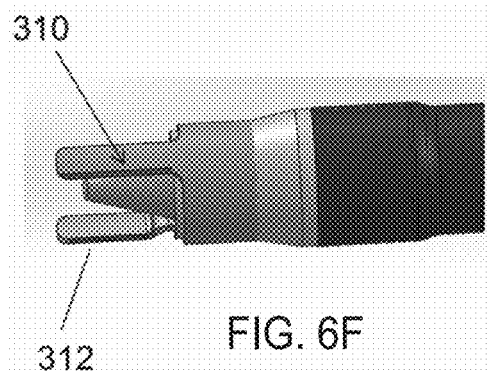
Figure 6G:
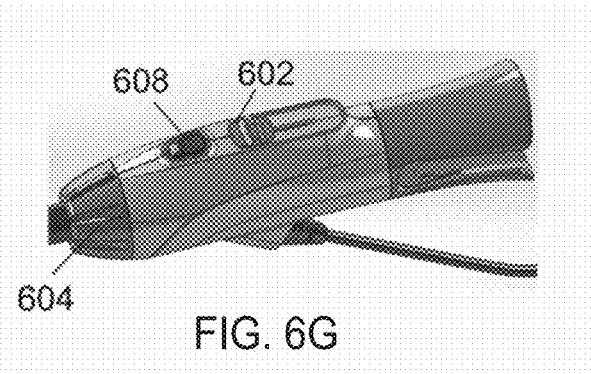

As the cannula 100 is being advanced, the cutting portions of the cutting elements may be kept in a retracted position proximally of the dissection tip so not to interfere with tissue dissection until a branch vessel is encountered, as shown in FIGS. 6B-6G. When a branch vessel is reached, the cutting portions 310, 312 may be moved in a distal direction beyond the dissection tip 120 by advancing the translational control or slider control 602 on the handle 600 distally, as shown in FIGS. 6D-6E. As noted above, the cutting portions may be biased toward one another and may be advanced out together and enter into the field of view of the endoscope in the dissection tip.

Next, the cutting portions may be rotated away from one another using the rotation control 604 to an open configuration, for sealing and cutting the branch vessel. The cutting portions may be rotated around the dissection tip in a circular arc motion. The endoscopic cannula may be positioned such that the target branch vessel may lay across one of the cutting portions regardless of orientation of the branch vessel in relation to the main blood vessel to be harvested. The endoscopic cannula may be designed such that the user can place the endoscopic cannula and the cutting portions as far away from the target main vessel as possible to avoid injury to the main vessel. Next, when the branch vessel is positioned in between the cutting portions 310, 312 the user may allow the cutting portions to come back together into a closed configuration, capturing the branch vessel between them. In some embodiments, the user may bring the cutting portions together manually. Alternatively or additionally, the rotational control may be spring loaded to bias the cutting sections toward one another. The energy control 608 button may then be pressed to transfer the energy into the branch vessel to seal the vessel. In some embodiments, the cutting portions may be energized before the cutting portions make contact with the branch vessel. After sealing is complete and the energy control button 608 is released, the user may continue to advance the rotation control 604 until the cutting portions transect the branch vessel. Once the branch vessel is cut, the user may then retract the cutting portions with the translation control 602 and advance the device to the next branch vessel until all tributaries have been successfully ligated and transected.

In some embodiments, to bias the cutting portions, the control handle 600 may include a biasing member 605 for spring loading the torsional movement of the control collar 604. In various embodiments, both cutting portions may be rotatable, while in other embodiments, only one of the cutting portions may be rotatable and the other one stationary. For example, the cannula 100 can be structured and arranged for externally spring loading the torsional movement between the control handle 600 and the control collar 604 so the cutting portions are kept in a closed configuration. In order to position the cutting portions onto a venous tributary, the control collar 604 can be rotated to move, one or both, cutting portions away from one another into an open configuration. Upon release of the control collar 604, a predetermined amount of compressive force can be applied to the tributary, followed by activation of the bipolar RF energy to cauterize the tributary. The compressive force on the tributary can be achieved by a spring force selection on the control collar 604 to optimize the process of tributary sealing. After application of bipolar cautery to seal the tributary, the cannula 100 can be rotated and/or displaced axially to cut the tributary.

Figure 7A:
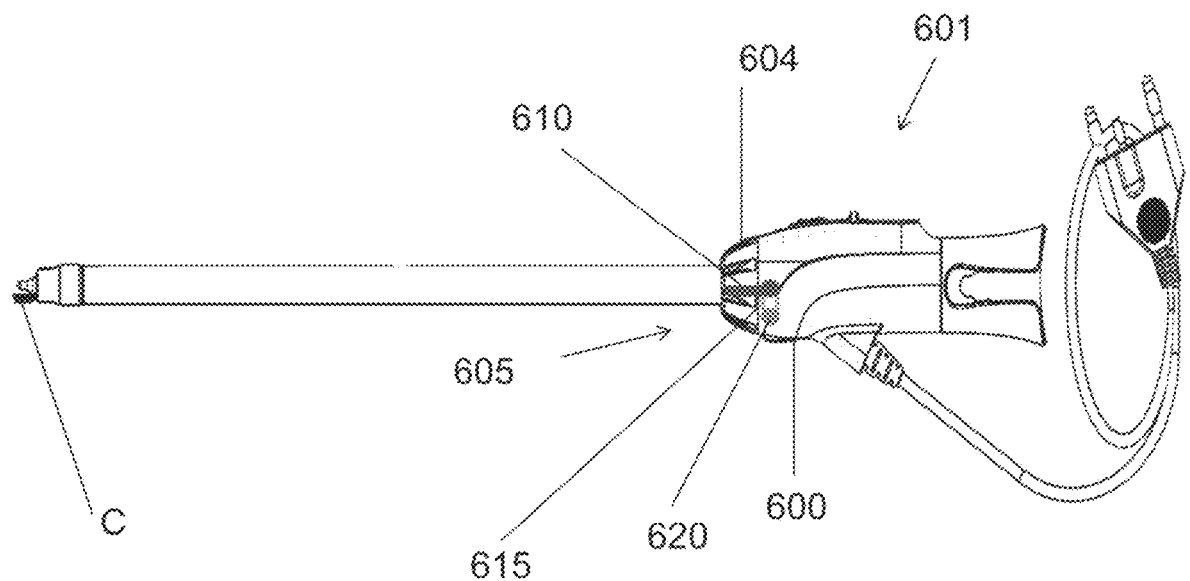
FIGS. 7A, 7B, 7C, 7D, 7E, and 7F illustrate an embodiment of a cutting unit of an endoscopic cannula of the present disclosure.
Figure 7B:
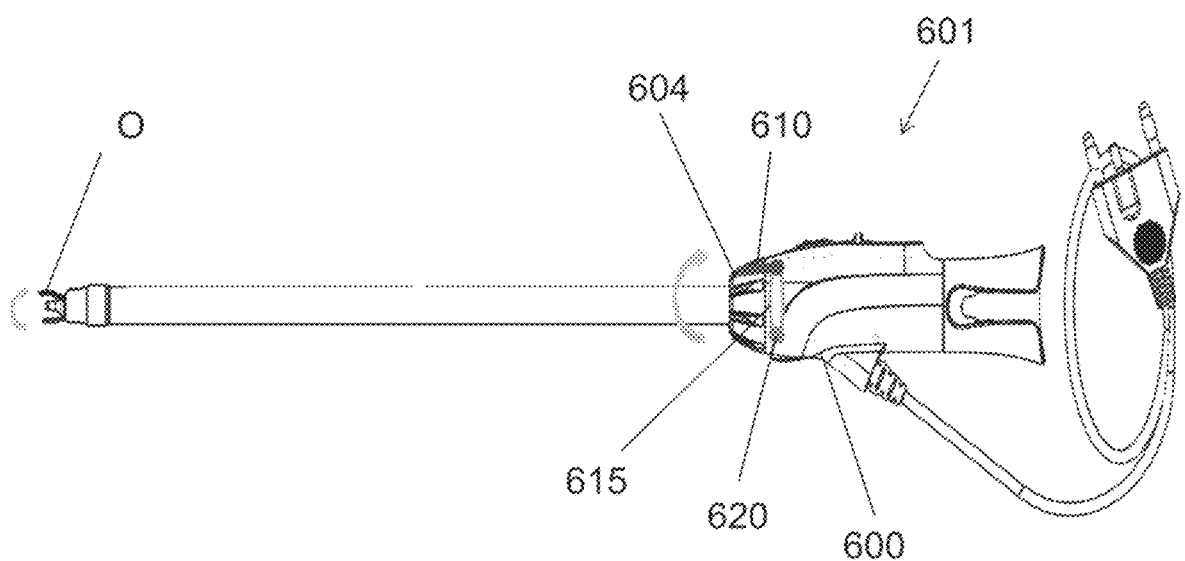

In references to FIGS. 7A and 7B, in some embodiments, the biasing member 605 may include a first control lever 610 attached to an outside surface of the control collar 604 and a corresponding second control lever 620 attached to an outside surface of the control handle 600 of the cannula 100. An elastic device or elastic band 615 may be used to connect the control levers 610, 620, placing the two in compression and likewise exerting a compressive force between the cutting portions to keep the cutting portions are in a closed configuration.

Figure 7C:
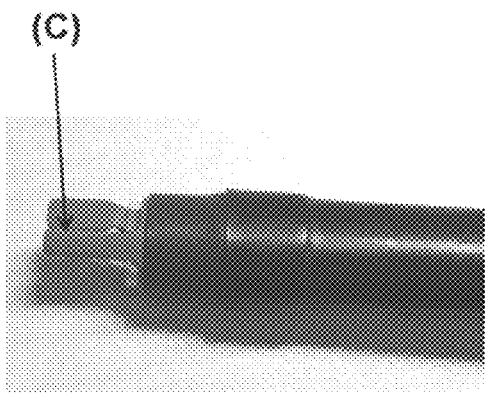
Figure 7D:
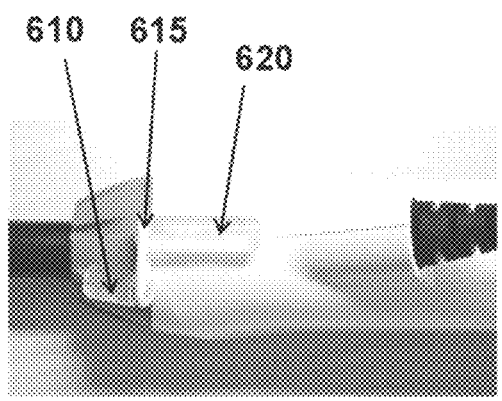
Figure 7E:
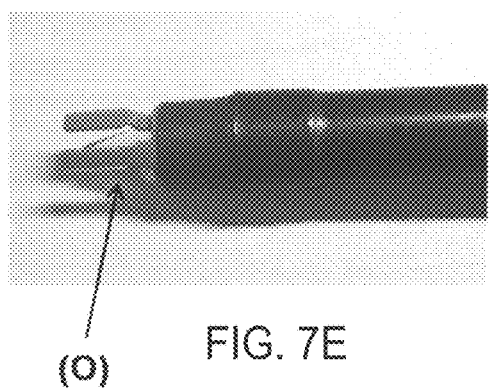
Figure 7F:
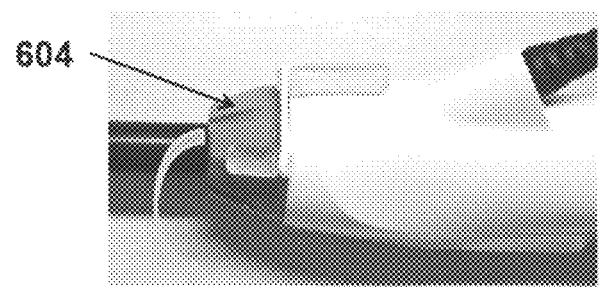

In reference to FIGS. 7C and 7D, the elastic band 615 is in a relaxed or contracted configuration, keeping the cutting portions in a closed configuration. In reference to FIGS. 7E and 7F, moving the rotational control 604 stretches the elastic band 615 and moves the cutting portions into the open configuration. Releasing of the collar may allow the elastic band to contract and move the cutting portions back into the closed configuration.

In some embodiments, the biasing member may be disposed inside the cavity of the control handle and the control collar. In some embodiments, the biasing member 615 may be used to standardize the compressive force applied to branch vessels during the cautery and transection process. In this manner, the variation in manual compressive forces exerted by different clinicians/users during the harvesting procedure may be eliminated to increase the likelihood of achieving hemostasis, thereby avoiding any potential of hemorrhage or bleeding during the procedure. External and internal biased cutting portions may remove the need for the user to maintain his or her hands in opposite directions for the duration of the cautery process so the user may be substantially less tired when performing multiple procedures.

Figure 8A:
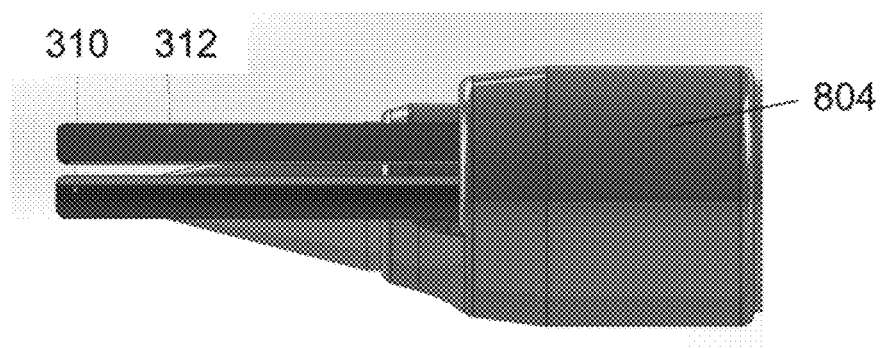
FIGS. 8A and 8B illustrate an embodiment of a cutting unit of an endoscopic cannula of the present disclosure.
Figure 8B:
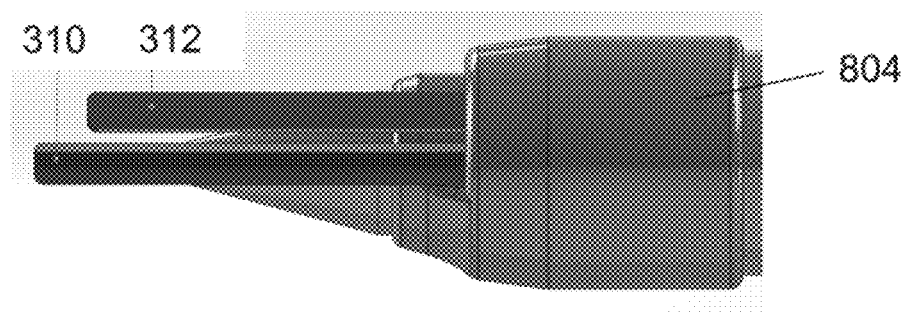

In some embodiments, the cutting portions 310, 312 may also be moveable in a longitudinal direction relative to one another, which may increase a cutting action achieved during transection of branch vessels, as shown in FIGS. 8A and 8B. As shown in FIG. 8A, the cutting portions 310, 312 may be extended distally along the dissection tip together. Then, as shown in FIG. 8B, the user may continue to translate one of the cutting portions 310, 312 distally from the extended position to a "hyper-extended" position. In the hyper-extended position, one of the cutting portions 310, 312 may be advanced further than the other cutting portion in a distal direction. During the surgical process it may be difficult for the cutting portions to transect or cut large diameter venous tributaries following their cauterization. Upon the application of bipolar cautery energy to the tributary, the tributary tissue may be desiccated, transforming it into a toughened fibrous strand, rather than the soft, tubular structure it assumes in its native state. The relative translational movement between the cutting portions may create a "slicing" action, which may help to server even the hardened vessels.

Figure 9A:
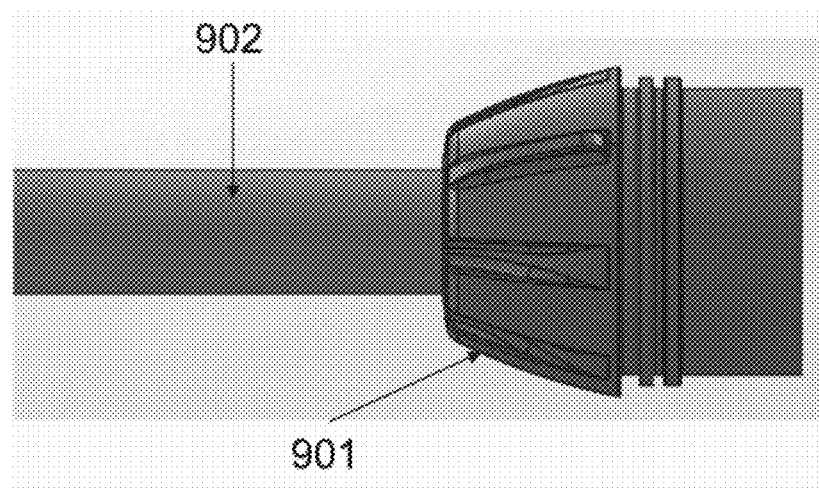
FIGS. 9A, 9B, 9C, 9D, 9E, 9F, and 9G illustrate an embodiment of a cutting unit of an endoscopic cannula of the present disclosure.
Figure 9B:
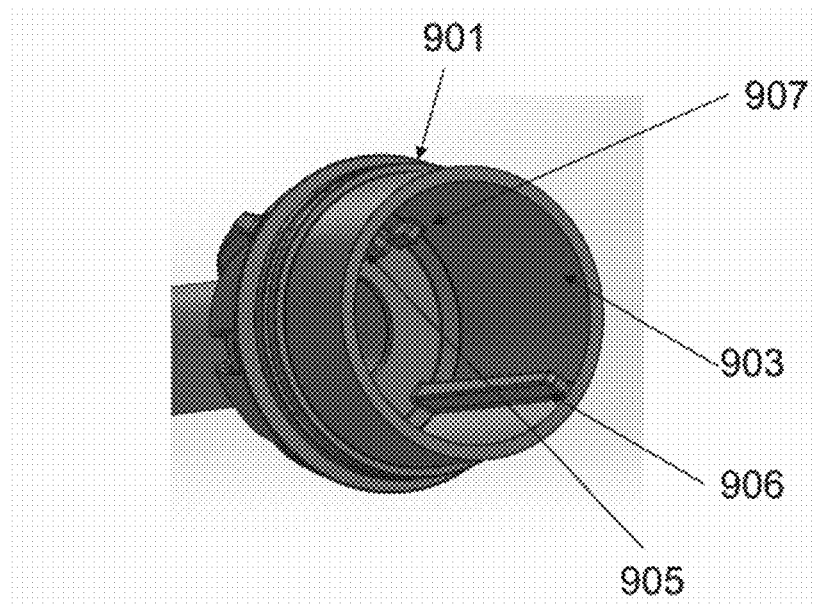
Figure 9C:
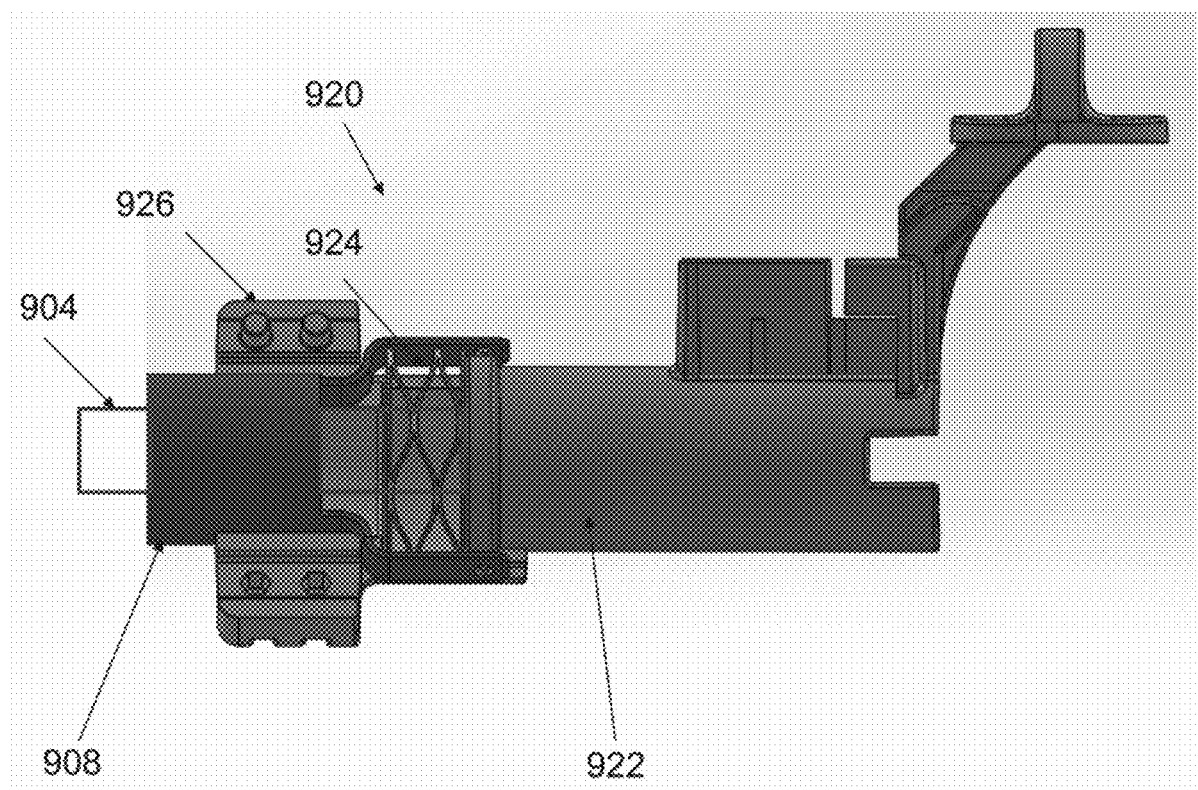
Figure 9D:
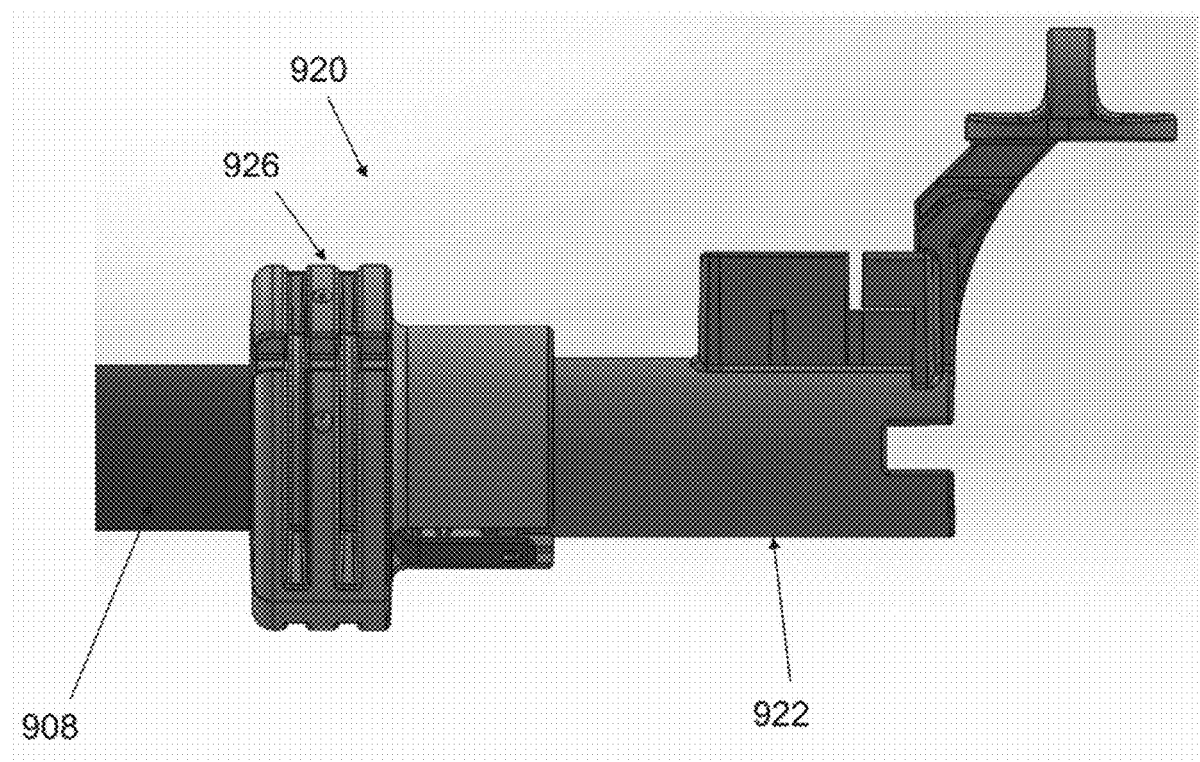
Figure 9E:
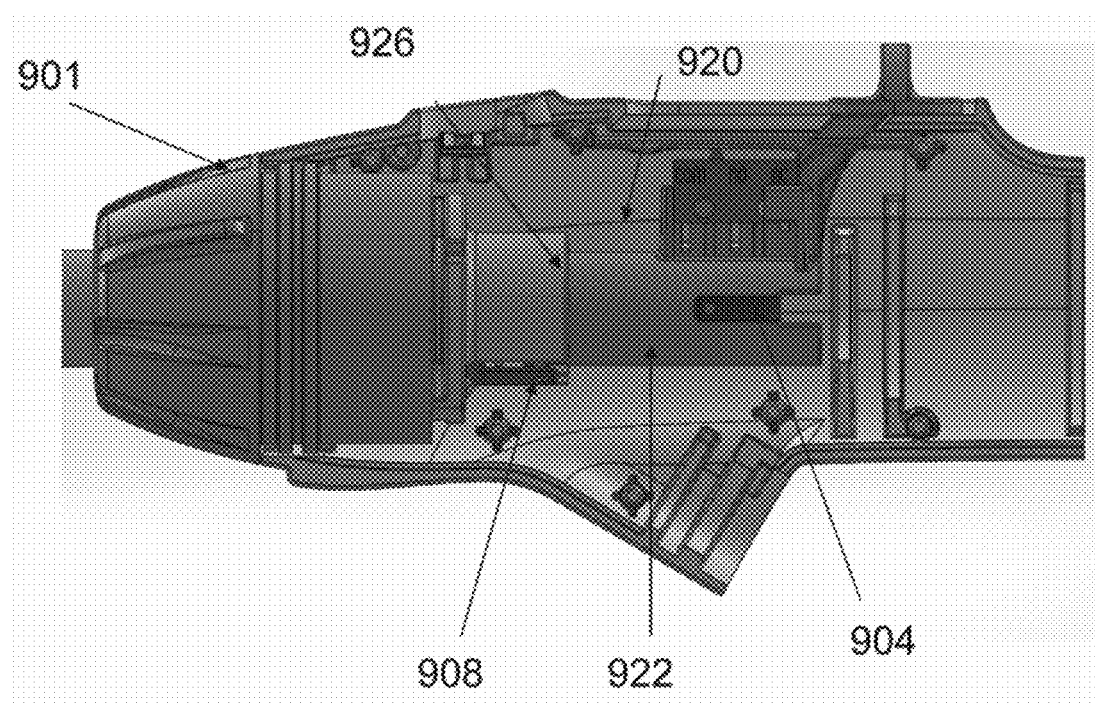

By way of a non-limiting example, FIGS. 9A-9G illustrates an exemplary assembly that can permit movement of the cutting portions in a longitudinal direction relative to one another. In reference to FIG. 9A, a rotator subassembly 901 may be attached at a proximal end of the outer sheath 902. As shown in FIG. 9B, the inner compartment 903 of the rotator subassembly 901 may include two keys 905, 906 and a stop 907, the purpose of which is described below. FIG. 9C illustrates an embodiment of an outer electrode sub-assembly 920, which may be disposed at a proximal end of the outer electrode 908. The outer electrode sub-assembly 920 may include an inner adapter 922 connected to the outer electrode 908 via a compressible element 924. The inner electrode 904 may extend through the outer electrode 908 and into the inner adapter 922, and may be secured to the inner adapter 922. In addition, as shown in FIG. 9D, an outer adapter 926 may be disposed about the outer electrode 908. The outer adapter 926 may be designed to allow the inner adapter 922 to rotate relative to the outer electrode 908, thus rotating the inner electrode 904 in relation to the outer electrode 908. As shown in FIG. 9E, the outer electrode sub-assembly 920 may be inserted into the rotator assembly 901 and a handle 928 is placed around the outer electrode sub-assembly 920.

Figure 9F:
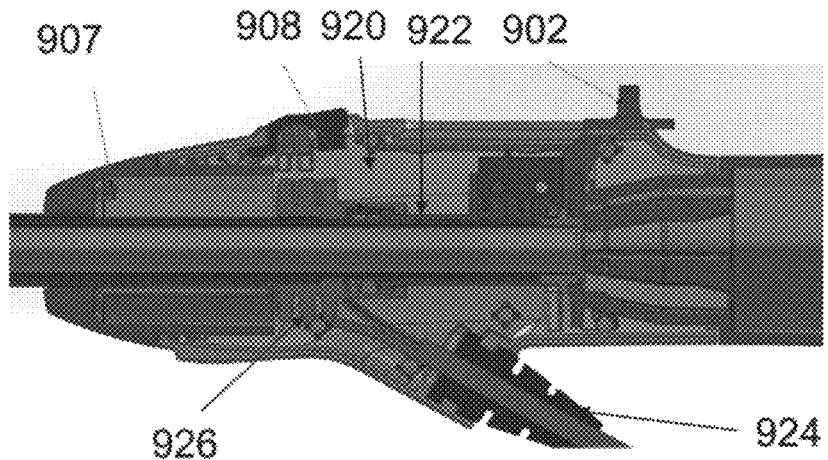
Figure 9G:
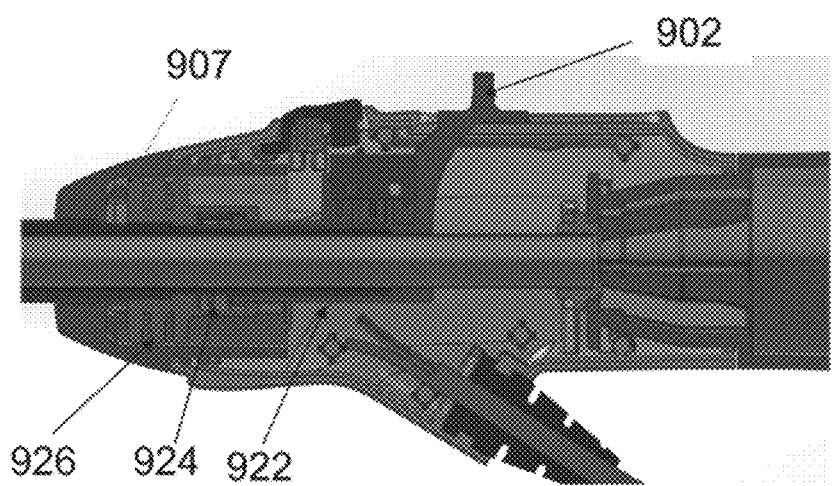

In operation, as shown in FIG. 9F, the outer electrode subassembly 920 may be retracted to retract the cutting portions. To extend the cutting portions, the slider 602 may be advanced in the distal direction to move the outer electrode subassembly 920 in the distal direction. As shown in FIG. 9G, the outer electrode subassembly may be advanced forward until the outer adapter 926 is pressed against the stop 907 of the rotator subassembly 901. At this point, the cutting portions are advanced to an extended position together, as shown for example in FIG. 8A. Next, the slider 902 may be moved further in the distal direction to move the inner adapter 922 to compress the compressible element 924. Such movement of the inner adapter 922 may also move the inner electrode further in the distal direction, while the outer electrode 908 may remain stationary. In this manner, the cutting portion of the inner electrode 904 may be moved in the longitudinal direction relative to the cutting portion of the outer electrode 908 to the hyper-extended position, as shown in FIG. 8B.

Figure 10A:
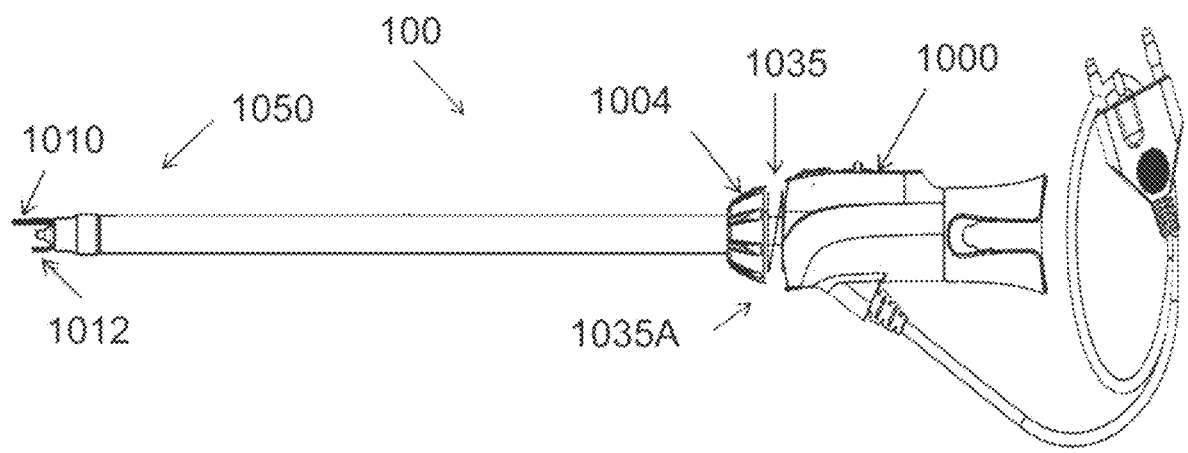
FIGS. 10A, 10B, 10C, and 10D illustrate an embodiment of a cutting unit of an endoscopic cannula of the present disclosure.
Figure 10B:
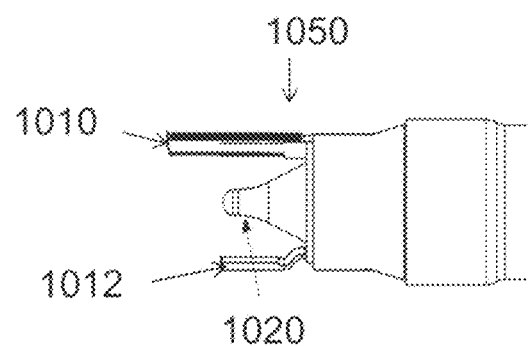

In reference to FIG. 10A and FIG. 10B, another embodiment for longitudinally moving the cutting portions relative to one another is illustrated. It should of course be understood that the design shown in FIGS. 9A-9G may be combined with the design of FIGS. 10A-10B. In reference to FIG. 10A, the cannula 100 may include a compressible element or compression spring 1035 positioned in a gap 1035A separating the control collar 1004 from the control handle 1000. An aspect of this configuration may provide for an axial motion between the cutting portions. For example, at least one rotating cutting portion 1010 can be activated by the control collar 1004 and lengthened by approximately 3-5 mm, the control collar 1004 can be displaced forward of the control handle 1000, and the compressible element 1035 placed in the gap 1035A between the control collar 1004 and the control handle 1000, such that retraction of the control collar 1004 against the control handle 1000 results in a 3-5 mm axial excursion of the rotating cutting portion 1010 against the stationary blade 1012.

Figure 10C:
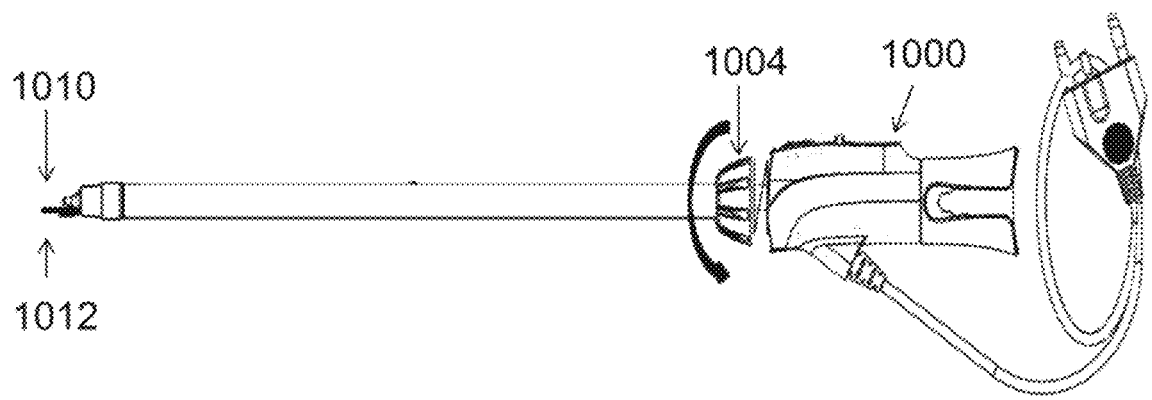
Figure 10D:
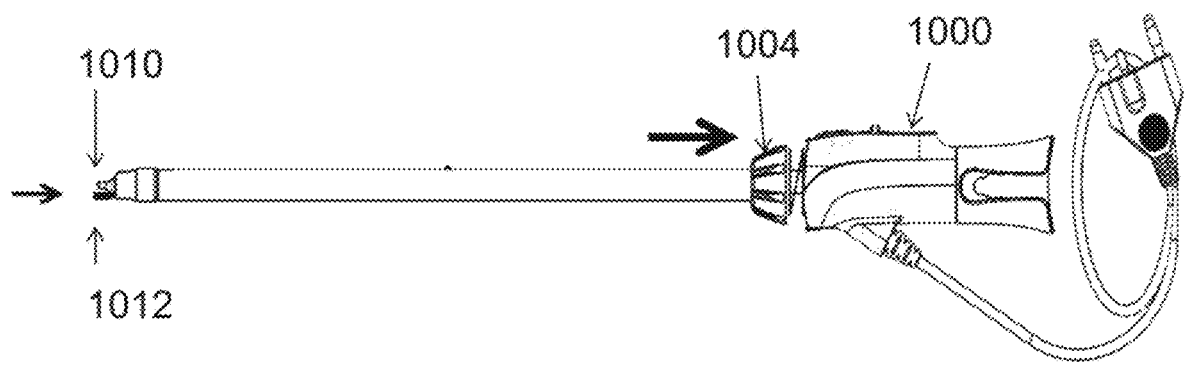

FIG. 10C and FIG. 10D illustrate the use of the axial motion between the two cutting portions 1010, 1012. For example, the control collar 1004 is rotated to close the long rotational portion 1010 onto the stationary cutting portion 1012, and bipolar electro cautery is applied to seal the tributary (FIG. 10C). While maintaining the cutting portions 1010, 1012 in a closed, compressed configuration, the control collar 1004 may be pulled back against the control handle 1000 to retract the long rotational cutting portion 1010 against the stationary cutting portion 1012, providing relative longitudinal movement between the two cutting portions 1010, 1012 (FIG. 10D).

It should be noted while preferred types of energy for various electrodes are indicated in the present disclosure, all electrodes can be energized using various sources of energy, including, but not limited to, resistive heating, ultrasound heating, and bipolar or monopolar RF energy. In some embodiments, the electrodes can be controlled independently of one another. It should also be noted that, when appropriate, the electrodes may be insulated with an insulating coating or insulating sheath.

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It will be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A surgical device, comprising:
    an elongated body including a tip at a distal end of the elongated body and a lumen extending through the elongated body, the tip including a transparent portion;
    an endoscope received in the lumen of the elongated body;
    a cutting unit including a first cutting portion and a second cutting portion and being moveable in a longitudinal direction distally from a retracted position toward the distal end of the elongated body, wherein at least one of the first cutting portion and the second cutting portion is rotatable about a longitudinal axis of the elongated body during use of the surgical device; and
    a visual cue disposed on the tip of the elongated body such that the visual cue is visible by an operator looking through the transparent portion of the tip with the endoscope during use of the surgical device to give the operator an indication of an exact angular position of an exit point of at least one of the first cutting portion and the second cutting portion circumferentially about the longitudinal axis of the elongated body when the cutting unit is in the retracted position so that interference with adjacent tissue structures can be avoided as the cutting unit is moved from the retracted position toward the tip.

2. The surgical device of claim 1, wherein the first cutting portion and the second cutting portion are movable in the longitudinal direction from the retracted position to an extended position over the tip.

3. The surgical device of claim 1, wherein the visual cue is at least one of an indentation, protrusion, and marking.

4. The surgical device of claim 1, wherein the visual cue is at least one of a vertical line, a horizonal line, an arrow, a dot, and a dotted line.

5. The surgical device of claim 1, wherein the first cutting portion is rotatable about the longitudinal axis of the elongated body as a blade and the second cutting portion is rotatably static about the longitudinal axis of the elongated body as an anvil.

6. The surgical device of claim 5, wherein the visual cue indicates where the anvil will extend in the longitudinal direction from the elongated body.

7. The surgical device of claim 1, wherein the visual cue is visualizeable by the operator on an electronic display.

8. The surgical device of claim 1, wherein the visual cue is located on one of an internal surface of the tip or an external surface of the tip.

9. The surgical device of claim 1 further comprising a biasing member configured to move the first cutting portion and the second cutting portion relative to one another from an open position where the first cutting portion and the second cutting portion are spaced away from one another to a closed position where the first cutting portion and the second cutting portion are in contact with one another.

10. The surgical device of claim 9 further comprising a rotation control collar disposed at a proximal end of the elongated body for moving the first cutting portion and the second cutting portion from the closed position to the open position, wherein the biasing member is coupled to the rotation control collar to return the first cutting portion and the second cutting portion to the closed position.

11. The surgical device of claim 1, wherein the first cutting portion and the second cutting portion are configured to be energized for sealing, cutting or both of a captured blood vessel therebetween.

12. The surgical device of claim 1, wherein the first cutting portion has a sharpened edge and an edge of the second cutting portion facing the sharpened edge of the first cutting portion is flat.

13. The surgical device of claim 1, wherein the first cutting portion is stationary and the second cutting portion is rotatable about the tip away from the first cutting portion.

14. The surgical device of claim 1, wherein the second cutting portion is bidirectionally rotatable about the tip.

15. The surgical device of claim 1, wherein the tip includes a stiff transition element having a cut-out to permit the first cutting portion and the second cutting portion to extend therethrough.

16. A surgical device, comprising:
an elongated body including a tip arranged at a distal end of the elongated body, the tip including a transparent portion;
a retractable surgical tool having a retracted configuration where the retractable surgical tool is completely retracted into the elongated body and an extended configuration where a distal end of the retractable surgical tool extends distal of the tip; and
a visual cue disposed on the tip of the elongated body such that the visual cue is visible by an operator looking through the transparent portion of the tip during use of the surgical device to give the operator an indication of an exact angular position of an exit point of at least a first cutting portion of the retractable surgical tool circumferentially about a longitudinal axis of the elongated body when the retractable surgical tool is in the retracted configuration such that interference of the first cutting portion with adjacent tissue structures can be avoided as a visual cue disposed on the tip of the elongated body such that the visual cue is visible by an operator is moved from the retracted configuration toward the extended configuration.

17. The surgical device of claim 16, wherein the retractable surgical tool additionally includes a second cutting portion, the first cutting portion being rotatable about the longitudinal axis of the elongated body as a blade and the second cutting portion being rotatably static about the longitudinal axis of the elongated body as an anvil.

18. The surgical device of claim 17, wherein the visual cue indicates where the anvil will extend in a longitudinal direction from the elongated body.

19. The surgical device of claim 16, wherein the visual cue is visualizeable by the operator on an electronic display.

20. The surgical device of claim 16, wherein the visual cue is located on one of an internal surface of the tip or an external surface of the tip.

21. A surgical device, comprising:
an elongated body including a tip at a distal end of the elongated body and a lumen extending through the elongated body, the tip including a transparent portion;
an endoscope received in the lumen of the elongated body;
a cutting unit including a first RF electrode and a second RF electrode being moveable in a longitudinal direction from within the elongated body toward the distal end of the elongated body for subsequently harvesting a tissue; and
a visual cue disposed on the tip of the elongated body and acting as a reference point for an operator looking through the transparent portion of the tip with the endoscope during use of the surgical device for determining an exact exit point of the first RF electrode from within the elongated body so that rotational adjustment of the elongated body can be made, as necessary, to permit the first RF electrode to: (1) avoid damaging non-harvested tissue and/or (2) be closer to the tissue for subsequent harvesting when the first RF electrode is advanced from within the elongated body toward the tip of the elongated body.

* * * * *